(12) United States Patent
Ding

(10) Patent No.: US 10,670,712 B2
(45) Date of Patent: Jun. 2, 2020

(54) METHODS AND APPARATUS FOR A MIMO RADAR

(71) Applicant: ANALOG DEVICES, INC., Norwood, MA (US)

(72) Inventor: Xueru Ding, Newton, MA (US)

(73) Assignee: ANALOG DEVICES, INC., Norwood, MA (US)

( * ) Notice: Subject to any disclaimer, the term of this patent is extended or adjusted under 35 U.S.C. 154(b) by 189 days.

(21) Appl. No.: 15/862,234

(22) Filed: Jan. 4, 2018

(65) Prior Publication Data

US 2019/0207322 A1 Jul. 4, 2019

(51) Int. Cl.
| | |
|---|---|
| G01S 13/00 | (2006.01) |
| G01S 13/931 | (2020.01) |
| H01Q 21/06 | (2006.01) |
| G01S 13/42 | (2006.01) |
| G01S 7/03 | (2006.01) |
| G01S 13/02 | (2006.01) |
| H01Q 3/36 | (2006.01) |
| H01Q 1/24 | (2006.01) |
| H01Q 1/32 | (2006.01) |

(52) U.S. Cl.
CPC .............. *G01S 13/931* (2013.01); *G01S 7/03* (2013.01); *G01S 13/42* (2013.01); *H01Q 21/065* (2013.01); *G01S 13/02* (2013.01); *H01Q 1/247* (2013.01); *H01Q 1/3233* (2013.01); *H01Q 3/36* (2013.01)

(58) Field of Classification Search
CPC .......... G01S 13/42; G01S 7/41; G01S 13/931; G01S 7/03; H01Q 21/065
See application file for complete search history.

(56) References Cited

U.S. PATENT DOCUMENTS

| | | | |
|---|---|---|---|
| 2008/0143587 A1 | 6/2008 | Johnson | |
| 2012/0274499 A1 | 11/2012 | Chang | |
| (Continued) | | | |

FOREIGN PATENT DOCUMENTS

| | | |
|---|---|---|
| CN | 101762816 B | 12/2011 |
| CN | 104614726 B | 5/2017 |

OTHER PUBLICATIONS

Hong, et al., "Spatial Multiplexing in Correlated Fading via the Virtual Channel Representation", IEEE Journal on Selected Areas in Communications, vol. 21, No. 5, Jun. 2003, pp. 856-866.

(Continued)

*Primary Examiner* — Dieu Hien T Duong
(74) *Attorney, Agent, or Firm* — Knobbe, Martens, Olson & Bear, LLP

(57) ABSTRACT

Disclosed systems and methods include a multiple-in-multiple-out ("MIMO") antenna array, wherein the arrangement of antenna elements provide relatively good angular resolution for RADAR while reducing the presence of grating lobes. Transmitter and receiver antenna elements can be spaced such as to improve performance with reduced cost. In some embodiments, the transmitter and/or receiver antenna elements can be spaced at unit distances of a half-wavelength +/−10% or +/−25%. In some embodiments, the first receiver antenna element is at a four-unit distance from a second receiver antenna element, a third receiver antenna element at a one-unit distance from the second receiver antenna element, and a fourth receiver antenna element at a two-unit distance from the third receiver antenna element.

20 Claims, 21 Drawing Sheets

(56) References Cited

U.S. PATENT DOCUMENTS

2017/0293028 A1* 10/2017 Trummer .................. G01S 7/41
2019/0049577 A1* 2/2019 Iida ......................... G01S 13/42

OTHER PUBLICATIONS

Almers, et al., "Survey of Channel and Radio Propagation Models for WirelessMIMO Systems", Hindawi Publishing Corporation, EURASIP Journal onWireless Communications and Networking, vol. 2007, Article ID 19070, 19 pages, doi:10.1155/2007/19070.

* cited by examiner

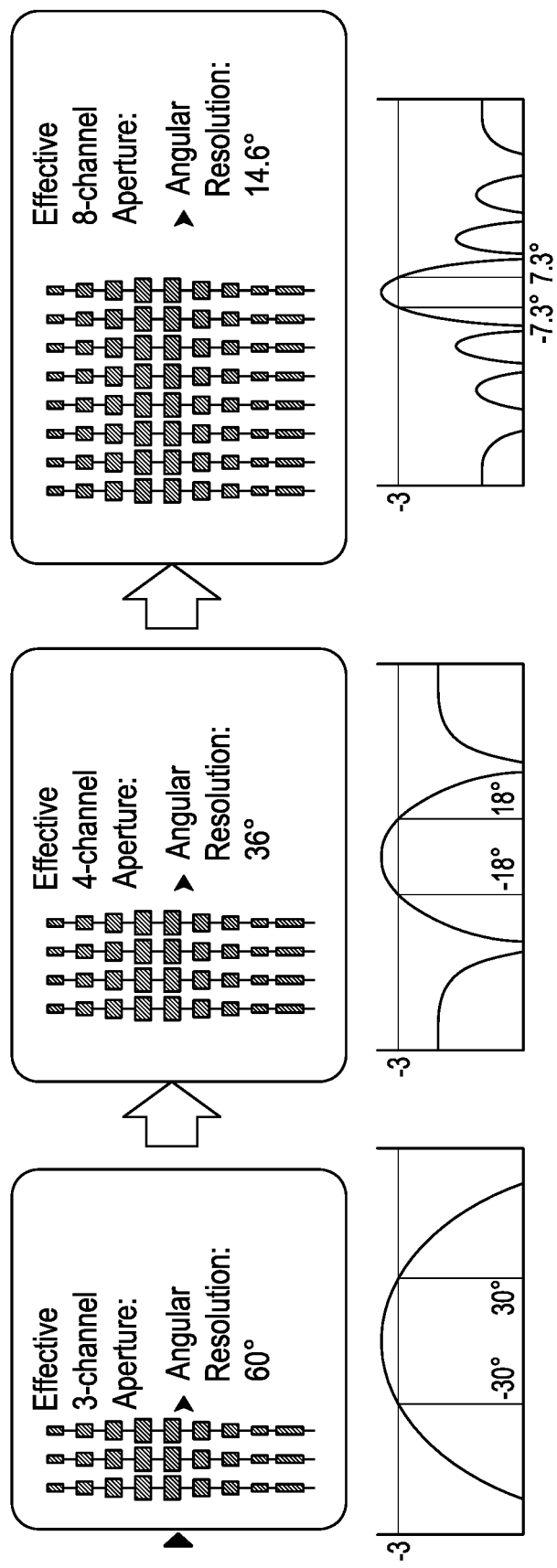

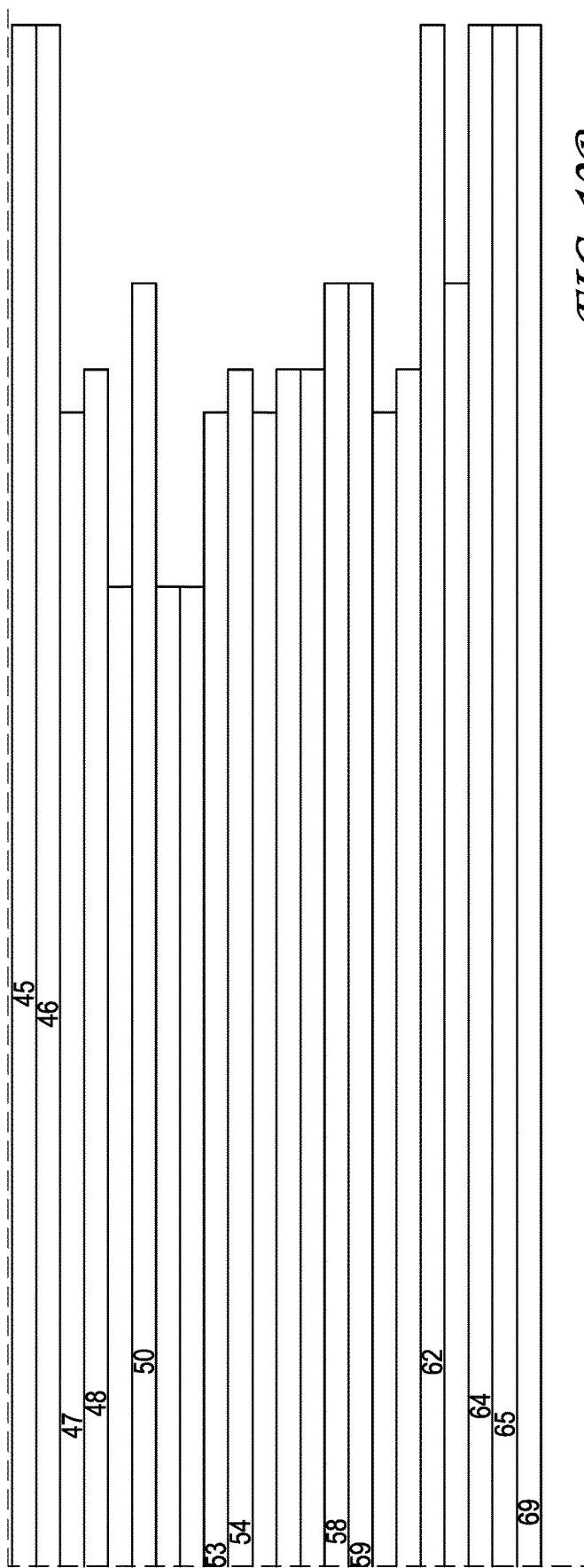

METHODS AND APPARATUS FOR A MIMO RADAR

FIELD OF DISCLOSURE

Embodiments of this disclosure generally relate to Multiple-In Multiple-Out ("MIMO") antennas, and in particular, to MIMO antennas for RADAR.

BACKGROUND

Modern MIMO radar systems are used in a variety of applications, such as telecommunications, automobile applications, and the like. The aperture size of a MIMO radar system is a significant factor that affects angular resolution and the number of channels in the aperture. The distance between each adjacent channel pair is also a factor of angular ambiguity.

In order to reduce overall system costs, it is preferable to design a MIMO radar system with a limited antenna area and a limited number of transmit ("TX") channels and receive ("RX") channels. Conventional radar aperture design, including traditional single-input-multiple-output ("SIMO") radar systems and MIMO radar systems, use a half wavelength for a two-way channel-to-channel distance. The overall radar aperture size of an N-channel radar can be (N−1)*λ/2, or N*λ/2 if the antenna patch area is included.

In order to increase angular resolution, some MIMO radar systems are using antenna structures with a channel-to-channel distance larger than λ/2 or half-wavelength. However, such MIMO radar systems can suffer from worsened angular ambiguity performance caused by grating lobes in the antenna pattern.

SUMMARY

The innovations described in the claims each have several aspects, no single one of which is solely responsible for its desirable attributes. Without limiting the scope of the claims, some prominent features of this disclosure will now be briefly described.

One aspect of this disclosure includes an multiple-in-multiple-out ("MIMO") antenna array apparatus comprising: a receiver antenna arrangement, wherein the receiver antenna arrangement comprises a plurality of receiver antenna elements of an antenna array arranged in a pattern such that a first receiver antenna element is adjacent to a second receiver antenna element at a first distance, and the second receiver antenna element is adjacent to a third receiver antenna element at a second distance; and a transmitter antenna arrangement, wherein the transmitter antenna arrangement comprises a first transmitter antenna element that is adjacent to the third receiver antenna element at a third distance, wherein the first distance, the second distance, and the third distance are different distances.

In some embodiments, the receiver antenna arrangement further comprises a pattern such that the first receiver antenna element is adjacent to a fourth receiver antenna element at a forth distance, and the fourth receiver antenna element is adjacent to a fifth receiver antenna element at a fifth distance, wherein the first distance, the second distance, the third distance, the fourth distance, and the fifth distance are different distances.

In some embodiments, the transmitter antenna arrangement further comprises a pattern such that a second transmitter antenna element is adjacent to the fifth receiver antenna element at a sixth distance and a third transmitter antenna element is adjacent to the second transmitter antenna element at a seventh distance, wherein the first distance, the second distance, the third distance, the fourth distance, the fifth distance, and the sixth distance are different distances.

In some embodiments, the first distance is a half wavelength.

In some embodiments, the second distance is a wavelength.

In some embodiments, the third distance is a two wavelengths.

In some embodiments, the receiver antenna arrangement and the transmitter antenna arrangement are arranged in a pattern such that the receiver antenna elements and the one or more transmitter antenna elements are disposed on along a single axis.

Another aspect of the disclosure includes a multiple-in-multiple-out ("MIMO") antenna array apparatus for radar comprising: a receiver antenna arrangement, wherein the receiver antenna arrangement comprises a plurality of receiver antenna elements of an antenna array arranged in a pattern such that a first receiver antenna element is adjacent to a second receiver antenna element at about a one-unit distance, a third receiver antenna element is adjacent to the second receiver antenna element at about a two-unit distance, and a fourth receiver antenna element is adjacent to the first receiver antenna element at about a four-unit distance; and a transmitter antenna arrangement, wherein the transmitter antenna arrangement comprises one or more transmitter antenna elements of an antenna array arranged in a pattern such that a first transmitter antenna element is adjacent to the third receiver antenna element at about a five-unit distance and is placed in the one side of the printed circuit board.

In some embodiments, the transmitter antenna arrangement further comprises a second transmitter antenna element adjacent to the fourth receiver antenna element at about a ten-unit distance.

In some embodiments, the transmitter antenna arrangement further comprises a third transmitter antenna element adjacent to the second transmitter antenna element at about an eleven-unit distance.

In some embodiments, the receiver antenna arrangement and the transmitter antenna arrangement are arranged in a pattern such that the receiver antenna elements and the transmitter antenna elements are disposed on along a single axis.

In some embodiments, a single unit distance is a half wavelength.

In some embodiments, a single unit distance is a half wavelength +/−10%.

In some embodiments, a single unit distance is a half wavelength +/−25%.

Another aspect of the disclosure includes a multiple-in-multiple-out ("MIMO") antenna array apparatus for radiation of radio frequency signals comprising: an antenna element arrangement, wherein the antenna element arrangement comprises a plurality of antenna elements arranged in a pattern such that a first antenna element is adjacent to a second antenna element, a third antenna element is adjacent to the second antenna element, a fourth antenna element is adjacent to the first antenna element, and a fifth antenna element is adjacent to the third antenna element, wherein each of the antenna elements comprise a transmit antenna element and/or a receiver antenna element, wherein the antenna elements of the antenna element arrangement are placed along a single axis, wherein the distances between adjacent antenna elements in the antenna element arrangement are not evenly spaced.

In some embodiments, a distance between two adjacent antenna elements include a half wavelength.

In some embodiments, a distance between two other adjacent antenna elements include a wavelength.

In some embodiments, a distance between two other adjacent antenna elements include two wavelengths.

In some embodiments, the antenna element arrangement comprises a fourth antenna element adjacent to the third antenna element, a fifth antenna element adjacent to the fourth antenna element, and a sixth antenna element adjacent to a fifth antenna element, wherein the first, second, third, and fourth antenna elements comprise receiver antenna elements, and the fifth, sixth, and seventh antenna elements comprise transmitter antenna elements, wherein the distances between adjacent antenna elements in the antenna element arrangement are not evenly spaced.

In some embodiments, the antenna element arrangement comprises a fifth antenna element adjacent to the third antenna element, a sixth antenna element adjacent to the fourth antenna element, a seventh antenna element adjacent to the sixth antenna element, and an eighth antenna element adjacent to the seventh antenna element, wherein the first, second, third, fourth, and fifth antenna elements comprise receiver antenna elements, and the sixth, seventh, and eighth antenna elements comprise transmitter antenna elements, wherein the distances between adjacent antenna elements in the antenna element arrangement are not evenly spaced.

For purposes of summarizing the disclosure, certain aspects, advantages and novel features of the innovations have been described herein. It is to be understood that not necessarily all such advantages may be achieved in accordance with any particular embodiment. Thus, the innovations may be embodied or carried out in a manner that achieves or optimizes one advantage or group of advantages as taught herein without necessarily achieving other advantages as may be taught or suggested herein.

BRIEF DESCRIPTION OF THE DRAWINGS

Embodiments of this disclosure will now be described, by way of non-limiting example, with reference to the accompanying drawings.

FIGS. 4A, 4B, and 4C are illustrations of effective apertures and corresponding radiation patterns according to some embodiments. FIG. 4A illustrates an effective aperture and radiation pattern for a 3 virtual channel radar system according to some embodiments. FIG. 4B illustrates an effective aperture and radiation pattern for a 4 virtual channel radar system, with each channel at a half-wavelength distance from each other according to some embodiments. FIG. 4C illustrates an effective aperture and radiation pattern for an 8 virtual channel radar system, with each channel at a half-wavelength distance from each other according to some embodiments.

FIGS. 12B-1, 12B-2, 12B-3, and 12B-4 illustrates distances between virtual channel pairings of the radar system in FIG. 12A.

DETAILED DESCRIPTION

Figure 1B:
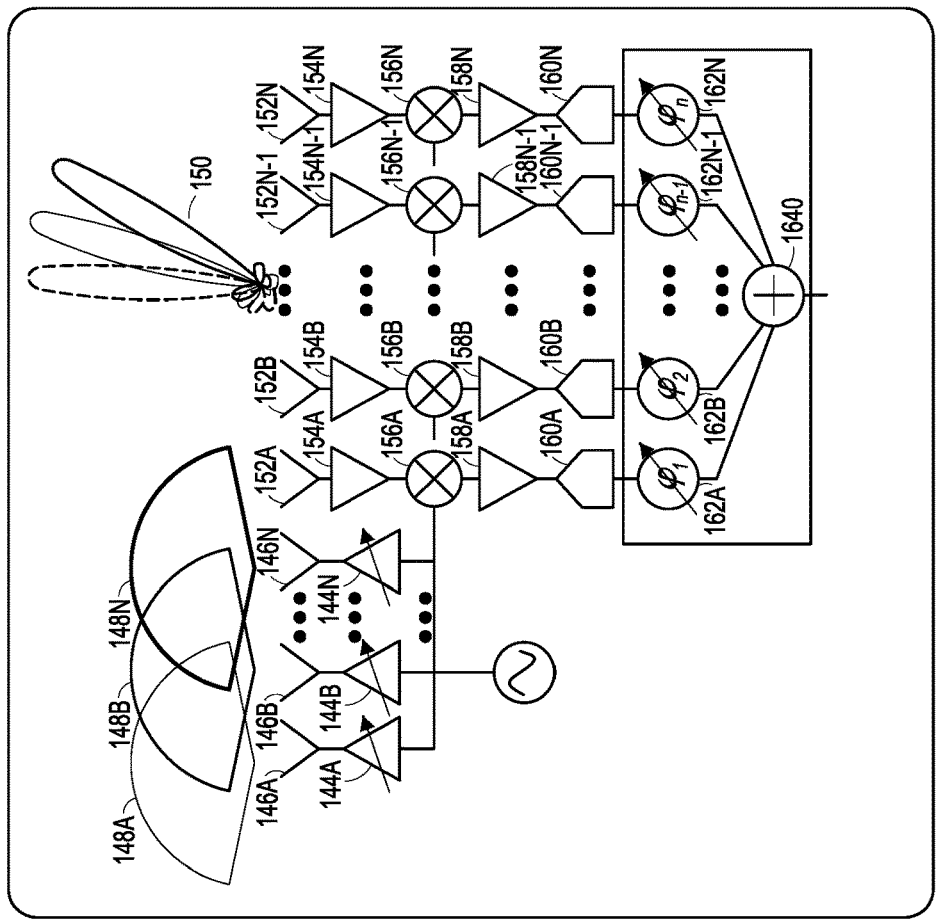
FIG. 1B is an illustration of a multiple-input-multiple-output ("MIMO") antenna array according to some embodiments.

The following detailed description of certain embodiments presents various descriptions of specific embodiments. However, the innovations described herein can be embodied in a multitude of different ways, for example, as defined and covered by the claims. In this description, reference is made to the drawings where like reference numerals can indicate identical or functionally similar elements. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings. The headings provided herein are for convenience only and do not necessarily affect the scope or meaning of the claims.

Disclosed systems and methods include a multiple-in-multiple-out ("MIMO") antenna array. In some embodiments, the MIMO antenna array includes an arrangement of antenna elements. The arrangement of antenna elements can include a transmitter arrangement and/or a receiver arrangement, each arrangement including a plurality of antenna elements. Advantageously, the arrangement of antenna elements can provide for increased angular resolution without causing grating lobes. Transmitter and/or receiver antenna elements can be spaced such as to improve the performance of virtual channels over conventional configurations. A weighting and/or a taper can be applied to the transmitter and/or receiver antenna elements in order to lower the side lobe level of the virtual 2-way radiation patterns. In some embodiments, the MIMO radar antenna array includes a transmitter arrangement and a receiver arrangement. The transmitter arrangement can include a plurality of transmitter antenna elements of an antenna array. The receiver arrangement can include a plurality of receiver antenna elements of an antenna array.

In some embodiments, the receiver arrangement can include a plurality of receiver antenna elements of an antenna array arranged in a pattern. In one embodiment, a first receiver antenna element can be at a one-unit distance from a second receiver antenna element. A third receiver antenna element can be at a two-unit distance from the second receiver antenna element. A fourth receiver antenna element can be at a four-unit distance from the first receiver antenna element. A first receiver antenna element can be placed between the second and fourth receiver antenna elements. A second receiver antenna element can be placed between the first and third receiver antenna elements. A fourth receiver antenna element can be adjacent to the first receiver antenna element. A first receiver antenna element can be adjacent to the second receiver antenna element. A second receiver antenna element can be adjacent to the third receiver antenna element. The particular receiver arrangement enables combinations with transmitter antenna elements to create virtual channels with an effective aperture size. Advantageously, the receiver arrangement can result in a wide range of distances between virtual channel pairs. Such a wide range of distances between virtual channel pairs can result in an increase in angular resolution without causing grating lobes.

In some embodiments, the transmitter arrangement can include a plurality of transmitter antenna elements of an antenna array arranged in a pattern. A first transmitter antenna element can be at a five-unit distance from the third receiver antenna element and can be placed in the one side of the printed circuit board. A second transmitter antenna element can be at a ten-unit distance from the fourth receiver antenna element. A third transmitter antenna element can be at an eleven-unit distance from the second transmitter antenna element. A first transmitter antenna element can be adjacent to the third receiver antenna element. A second transmitter antenna element can be adjacent to the fourth receiver antenna element. A third transmitter antenna element can be adjacent to the second transmitter antenna element. Combining the particular receiver arrangement with the transmitter arrangement can create virtual channels. Advantageously, the transmitter arrangement can result in a wide range of distances between virtual channel pairs. Such a wide range of distances between virtual channel pairs can result in an increase angular resolution without causing grating lobes.

In some embodiments, the first receiver antenna element, the second receiver antenna element, the third receiver antenna element, and/or the fourth receiver antenna element are placed between the second transmitter antenna element and the third antenna element.

In some embodiments, the transmitter and/or receiver antenna elements can be spaced at unit distances of a half-wavelength, a half-wavelength +/−10%, and/or a half-wavelength +/−25%.

Figure 1A:
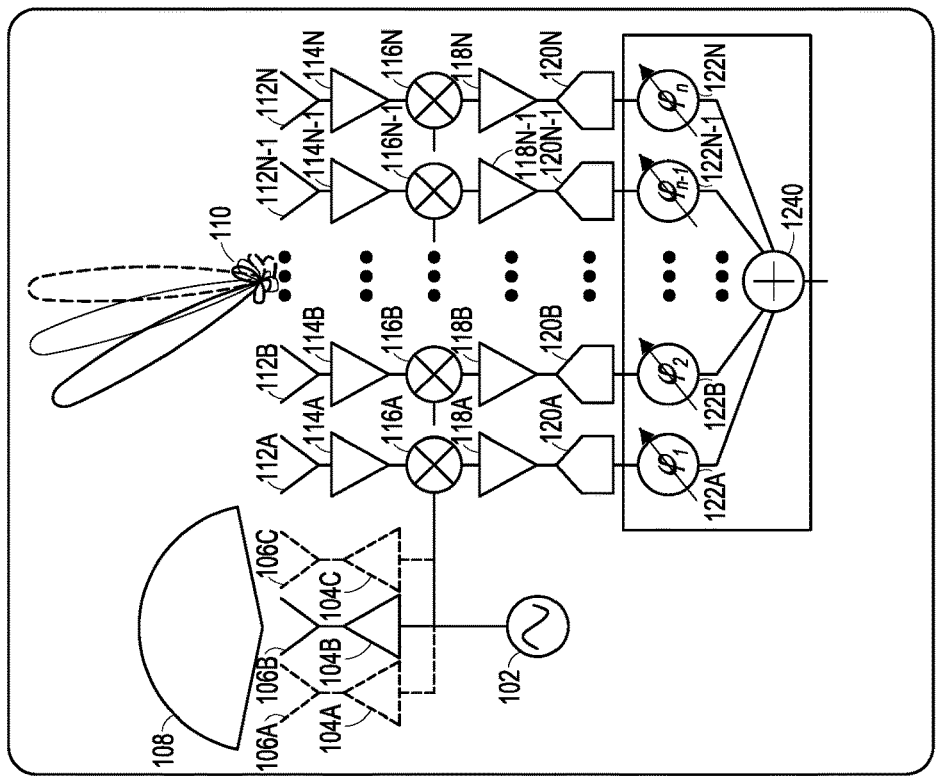
FIG. 1A is an illustration of a single-input-multiple-output ("SIMO") antenna array according to some embodiments.

Single-Input-Multiple-Output ("SIMO") and Multiple-Input-Multiple-Output ("MIMO") Antenna Arrays FIG. 1A is an illustration of a single-input-multiple-output ("SIMO") antenna array according to some embodiments. The SIMO antenna array can include a transmitter with one or more antennas fed by the fixed gain and power amplifiers, and/or a receiver with multiple independent antennas. The example of FIG. 1A illustrates a data source 102 that can feed into one or more fixed gain and power amplifiers (PA) 104A, 104B, 104N (collectively referred to herein as "power amplifiers 104"). The power amplifiers can feed into one or more transmitter antenna elements 106A, 106B, 106N (collectively referred to herein as "transmitter antenna elements 106"). The power amplifiers 104A and 104N, and the transmitter antenna elements 106A, 106N can be optional. The transmitter antenna elements 106 can create a radiation pattern 108.

In some embodiments, the SIMO antenna array can receive electromagnetic energy 110. The electromagnetic energy 110 can be the energy reflected from the radiation pattern 108. The SIMO antenna array can receive the electromagnetic energy 110 at the receiver antenna elements 112A, 112B, 112N-1, 112N (collectively referred to herein as "receiver antenna elements 112"). The electromagnetic energy 110 can be amplified by low noise amplifiers 114A, 114B, 114N-1, 114N (collectively referred to herein as "low noise amplifiers (LNA) 114"), down-converted by mixers 116A, 116B, 116N-1, 116N (collectively referred to herein as "mixers 116"), amplified by programmable gain amplifiers (PGA) 118A, 118B, 118N-1, 118N (collectively referred to herein as "programmable gain amplifiers 118"), converted to digital by analog-to-digital converters (ADC) 120A, 120B, 120N-1, 120N (collectively referred to herein as "analog-to-digital converters 120"), phase shifted by digital phase shifters 122A, 122B, 122N-1, 122N (collectively referred to herein as "digital phase shifters 122"), and combined by an adder 124. The digital phase shifters 122 and/or other components in the receiver can perform digital beam forming (DBF) for the receiver antenna array.

FIG. 1B is an illustration of a multiple-input-multiple-output ("MIMO") antenna array according to some embodiments. The MIMO antenna array can include a transmitter with one or more antennas fed by adjustable gain amplifiers, and/or a receiver with multiple antennas. The example of FIG. 1A illustrates a data source 142 that can feed into one or more adjustable power amplifiers 144A, 144B, 144N (collectively referred to herein as "power amplifiers 144") to adjust the gain, phase and/or switch ON or OFF of the signal. The power amplifiers can feed into one or more transmitter antenna elements 146A, 146B, 146N (collectively referred to herein as "transmitter antenna elements 146"). The transmitter antenna elements 146 can create one or more radiation patterns 148A, 148B, 148N (collectively referred to herein as "radiation patterns 148").

The MIMO antenna array can receive electromagnetic energy 150. The electromagnetic energy 150 can be reflected from an object within the radiation pattern 148. The electromagnetic energy 150 can be received at the receiver antenna elements 152A, 152B, 152C, 152D (collectively referred to herein as "receiver antenna elements 152"). The signal can be amplified by low noise amplifiers 154A, 154B, 154C, 154D (collectively referred to herein as "low noise amplifiers 154"), down-converted by mixers 156A, 156B, 156C, 156D (collectively referred to herein as "mixers 156"), amplified by programmable gain amplifiers 158A, 158B, 158C, 158D (collectively referred to herein as "programmable gain amplifiers 158"), converted to digital by analog-to-digital converters 160A, 160B, 160C, 160D (collectively referred to herein as "analog-to-digital converters 160"), phase shifted by digital phase shifters 162A, 162B, 162C, 162D (collectively referred to herein as "digital phase shifters 162"), and combined by an adder 164. The digital data can also be adjusted for magnitude (not shown) prior to being combined by the adder 164. The digital phase shifters 162 and magnitude adjustment can perform digital beam forming for the receiver antenna array.

Figure 2:
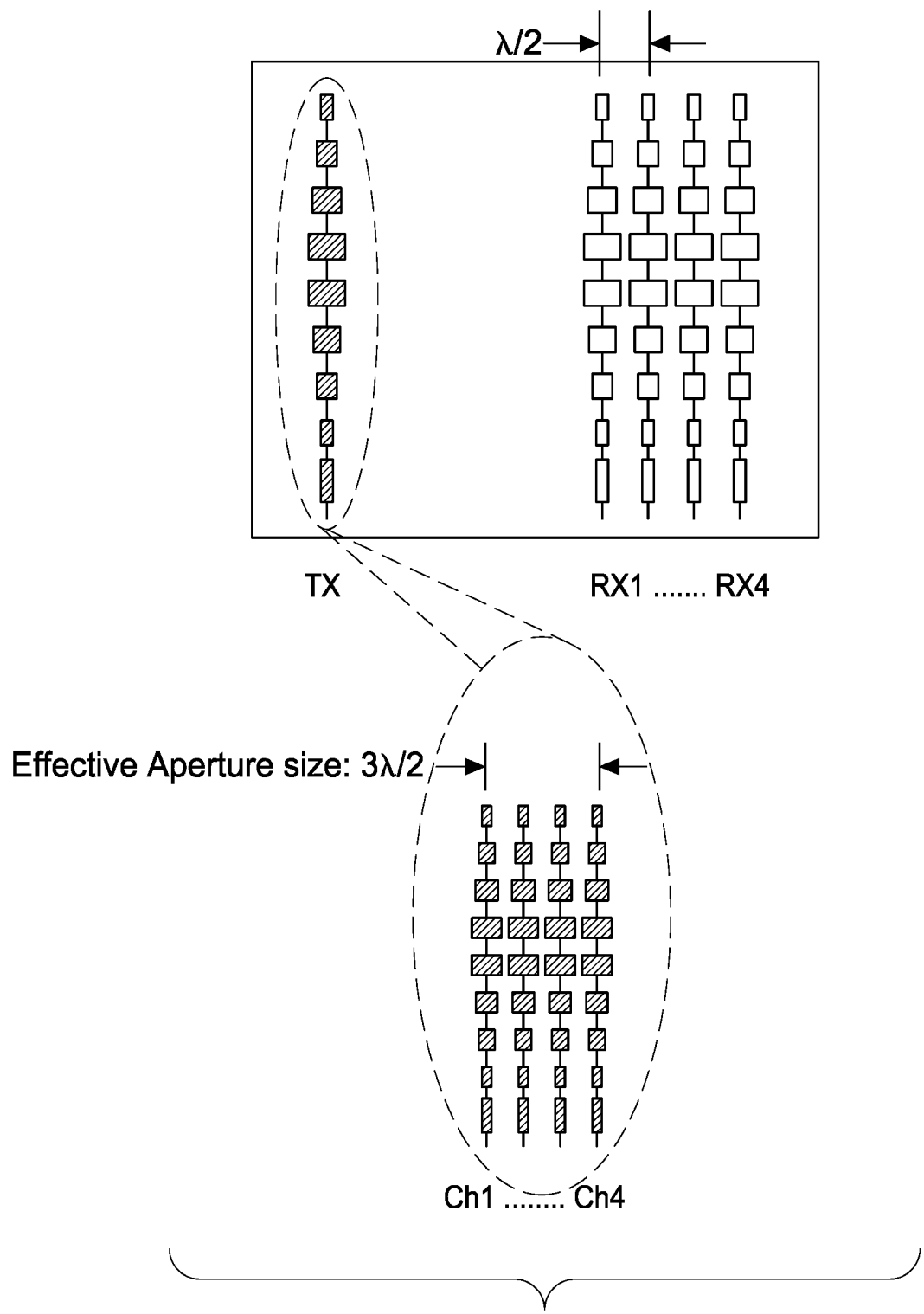
FIG. 2 is an illustration of virtual channels for a single-input-multiple-output ("SIMO") antenna array according to some embodiments.

Virtual Channels for a Single-Input-Multiple-Output ("SIMO") and Multiple-Input-Multiple-Output ("MIMO") Antenna Array FIG. 2 is an illustration of virtual channels for a single-input-multiple-output ("SIMO") antenna array according to some embodiments. The SIMO antenna array can include a single transmitter antenna element TX1, and four receiver antenna elements RX1, RX2, RX3, RX4. The distance between the receive antenna elements can be about a half-wavelength, a half-wavelength +/−5%, a half-wavelength +/−10%, a half-wavelength +/−25%, and the like.

In some embodiments, the effective aperture size of the single transmitter antenna element TX1 and the four receiver antenna elements RX1, RX2, RX3, RX4, with the distances between the receiver antenna elements being a half-wavelength apart can be three-halves-wavelength (1.5λ, where λ is a wavelength), or two wavelengths if the antenna patch area is included. The combination of a single transmitter antenna element TX1, and the four receiver antenna elements RX1, RX2, RX3, RX4 can create four virtual channels CH1, CH2, CH3, CH4. Because the receiver antenna elements RX1, RX2, RX3, RX4 are a half-wavelength apart, the total width of the virtual channels CH1, CH2, CH3, CH4 can be three-halves-wavelength, and thus, the effective aperture size can be three-halves wavelength, or two-wavelengths if the antenna patch area is included.

In an alternative embodiment, the same effective aperture size can be obtained using four transmitter antenna elements that are separated by a half-wavelength and a single receiver antenna element.

Figure 3:
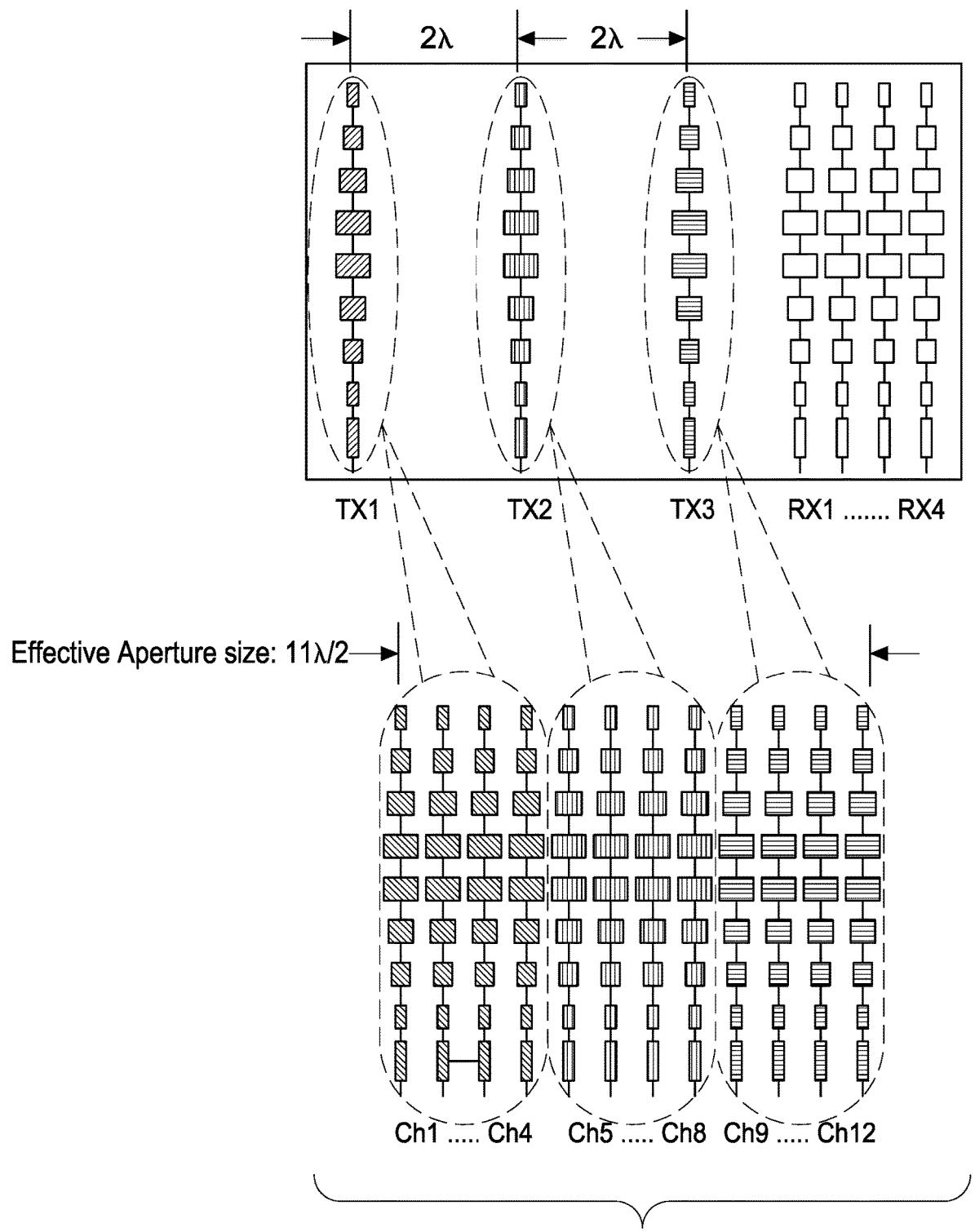
FIG. 3 is an illustration of virtual channels for a multiple-input-multiple-output ("MIMO") antenna array according to some embodiments.

FIG. 3 is an illustration of virtual channels for a multiple-input-multiple-output ("MIMO") antenna array with even spacing. The MIMO antenna array can include three transmitter antenna elements TX1, TX2, TX3, and four receiver antenna elements RX1, RX2, RX3, RX4. the distance between the receive antenna elements can be about a half-wavelength, and the distances between the transmitter antenna elements can be two-wavelengths. Other distances will be applicable.

In some embodiments, the effective aperture size of the three transmitter antenna elements TX1, TX2, TX3, and the four receiver antenna elements RX1, RX2, RX3, RX4 where the distances between the receiver antenna elements are a half-wavelength apart, and the distances between the transmitter antenna elements are two-wavelengths apart can be eleven-halves-wavelength (5.5λ), or six wavelengths if the antenna patch area is included. The group of four receiver antenna elements RX1, RX2, RX3, RX4 can generate four virtual channels for each transmitter antenna element TX1, TX2, TX3.

In some embodiments, the four receiver antenna elements RX1, RX2, RX3, RX4 that can receive the signal from the third transmitter antenna element TX3 can create the first set of virtual channels CH1, CH2, CH3, CH4. The first set of virtual channels CH1, CH2, CH3, CH4 can be a half-wavelength apart. The four receiver antenna elements RX1, RX2, RX3, RX4 that receive the signal from the second transmitter antenna element TX2 create the second set of virtual channels CH5, CH6, CH7, CH8. The second set of virtual channels CH5, CH6, CH7, CH8 can be a half-wavelength apart. The four receiver antenna elements RX1, RX2, RX3, RX4 that receive the signal from the first transmitter antenna element TX1 create the third set of virtual channels CH9, CH10, CH11, CH12. The third set of virtual channels CH9, CH10, CH11, CH12 can be a half-wavelength apart.

Each channel can be separated by a half-wavelength, the same distance as the separation between the four receiver antenna elements RX1, RX2, RX3, RX4. The three sets of virtual channels can be separated by the same distances. The three sets of virtual channels can be separated based on the distances between the three transmitter antenna elements TX1, TX2, TX3, two-wavelengths. Accordingly, the last channel in the first set CH4 can be adjacent to and a half-wavelength apart from the first channel in the second set CH5. The last channel in the second set CH8 can be adjacent to and a half-wavelength apart from the first channel in the third set CH9. The combined total effective aperture size can be eleven-halves wavelength, or six-wavelengths if the antenna patch area is included.

FIGS. 4A, 4B, and 4C are illustrations of effective apertures and corresponding radiation patterns for the achievable standard angular resolution after digital beam forming according to some embodiments. FIG. 4A illustrates a radar system with an effective aperture of 3 virtual channels. Each channel can be a half-wavelength distance from each other according to some embodiments. Such a radar system of FIG. 4A can be realized using a single transmitter antenna element TX1, and three receiver antenna elements RX1, RX2, RX3. Alternatively, the radar system can be realized using three transmitter antenna elements TX1, TX2, TX3, and a single receiver antenna element RX1. The angular resolution at −3 dB magnitude is from −30 to 30 degrees, providing an angle resolution of 60 degrees.

FIG. 4B illustrates a radar system with an effective aperture of 4 virtual channels, each channel at a half-wavelength distance from each other according to some embodiments. Such a radar system can be realized using a single transmitter antenna element TX1, and four receiver antenna elements RX1, RX2, RX3, RX4. Alternatively, the radar system can be realized using four transmitter antenna elements TX1, TX2, TX3, TX4, and a single receiver antenna element RX1. Furthermore, the radar system can be realized using two transmitter antenna elements TX1, TX2, and two receiver antenna elements RX1, RX2. The angle resolution at −3 dB magnitude can be from −18 to 18 degrees, providing an angle resolution of 36 degrees.

FIG. 4C illustrates a radar system with an effective aperture of 8 virtual channels, each channel at a half-wavelength distance from each other according to some embodiments. One example of this radar system can include a single transmitter antenna element TX1, and eight receiver antenna elements RX1, RX2, RX3, RX4, RX5, RX6, RX7, RX8, and the like. Alternatively, two transmitter antenna elements TX1, TX2 and four receiver antenna elements RX1, RX2, RX3, RX4 can be used, four transmitter antenna elements TX1, TX2, TX3, TX4 and two receiver antenna elements RX1, RX2 can be used, and/or eight transmitter antenna elements TX1, TX2, TX3, TX4, TX5, TX6, TX7, TX8 and a single receiver antenna element RX1 can be used. The angle resolution at −3 dB magnitude can be from −7.3 to 7.3 degrees, providing an angle resolution of 14.6 degrees.

Figure 5A:
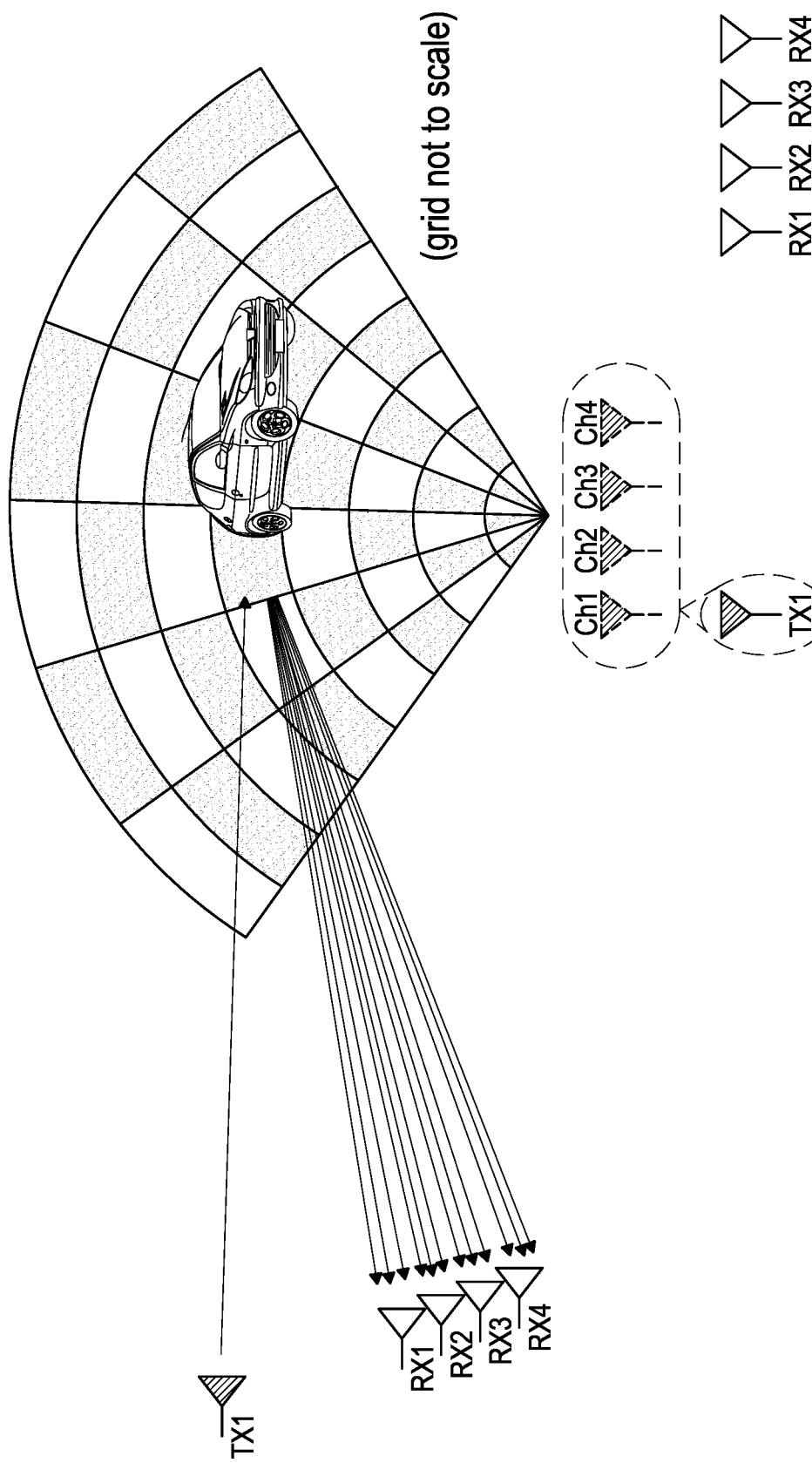
FIG. 5A illustrates an example of the angular resolution of a 4-virtual channel radar system according to some embodiments.

FIG. 5A illustrates the angular resolution of a 4-virtual channel radar system according to some embodiments. The 4-virtual channel radar system of FIG. 5A includes a transmitter arrangement including a single transmitter antenna element TX1 and a receiver arrangement including four receiver antenna elements RX1, RX2, RX3, RX4. As a result, four virtual channels CH1, CH2, CH3, CH4 are formed. The grid behind the vehicle illustrates an example of angular resolution of the 4-virtual channel radar system.

Figure 5B:
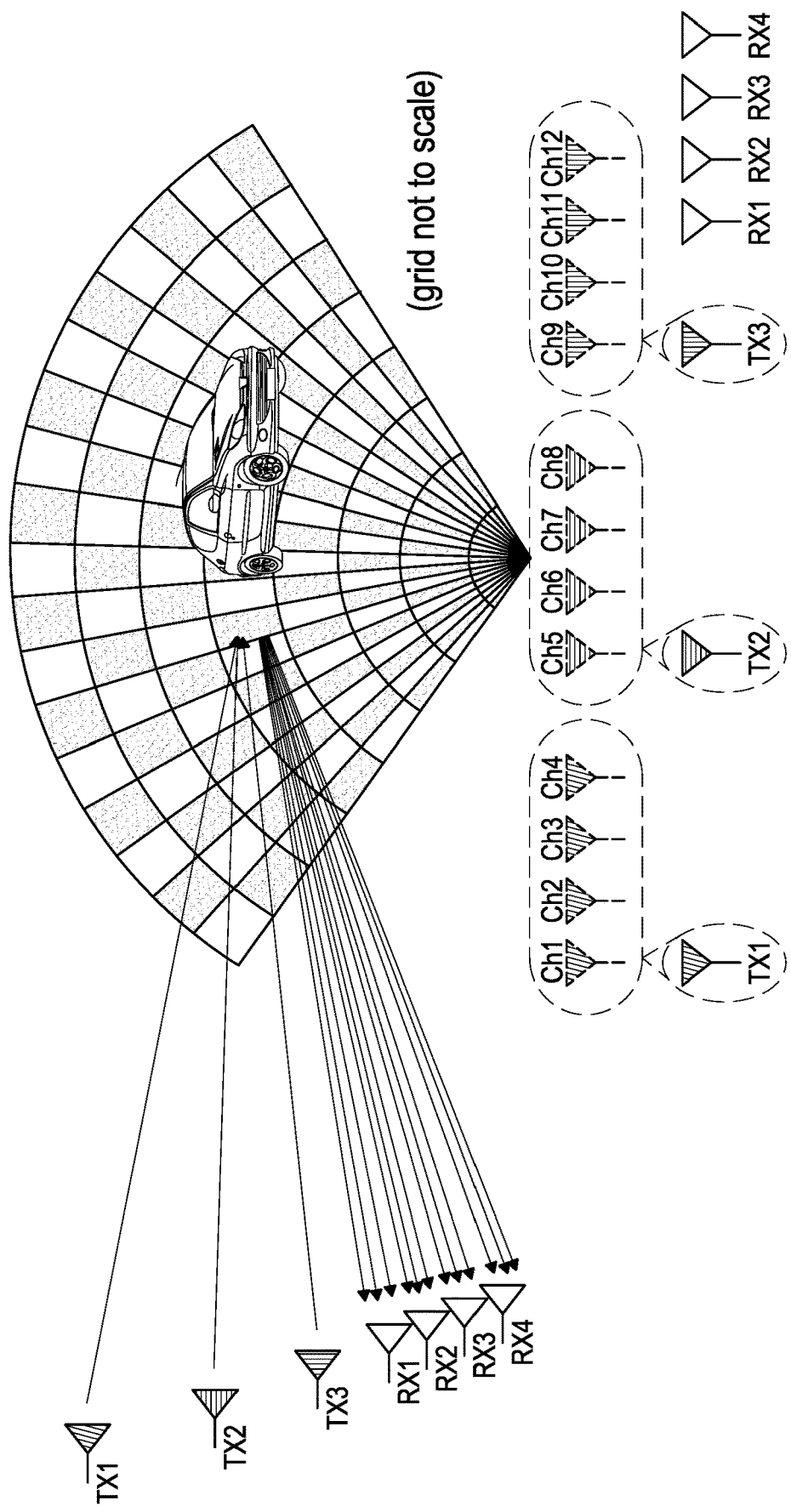
FIG. 5B illustrates an example of the angular resolution of a 12-virtual channel radar system according to some embodiments.

FIG. 5B illustrates the angular resolution of a 12-virtual channel radar system according to some embodiments. The 12-virtual channel radar system of FIG. 5B includes a transmitter arrangement including three transmitter antenna elements TX1, TX2, TX3 and a receiver arrangement including four receiver antenna elements RX1, RX2, RX3, RX4. As a result, 12 virtual channels CH1, CH2, CH3, CH4, CH5, CH6, CH7, CH8, CH9, CH10, CH11, CH12 are formed. The grid behind the vehicle illustrates an example of angular resolution of the 12-virtual channel radar system. The 12-virtual channel radar system creates a grid behind the vehicle with three-times-finer resolution than the 4-virtual channel radar system shown in FIG. 5A.

Performance with Channel-to-Channel Distance Larger than Half-Wavelength

To achieve better angular resolution, SIMO and MIMO antenna arrays can be arranged to include receiver and transmitter antenna element arrangements with a channel-to-channel distance larger than a half-wavelength. A disadvantage to this type of configuration is that it worsens angular ambiguity as a result of grating lobes in the antenna pattern.

Figure 6A:
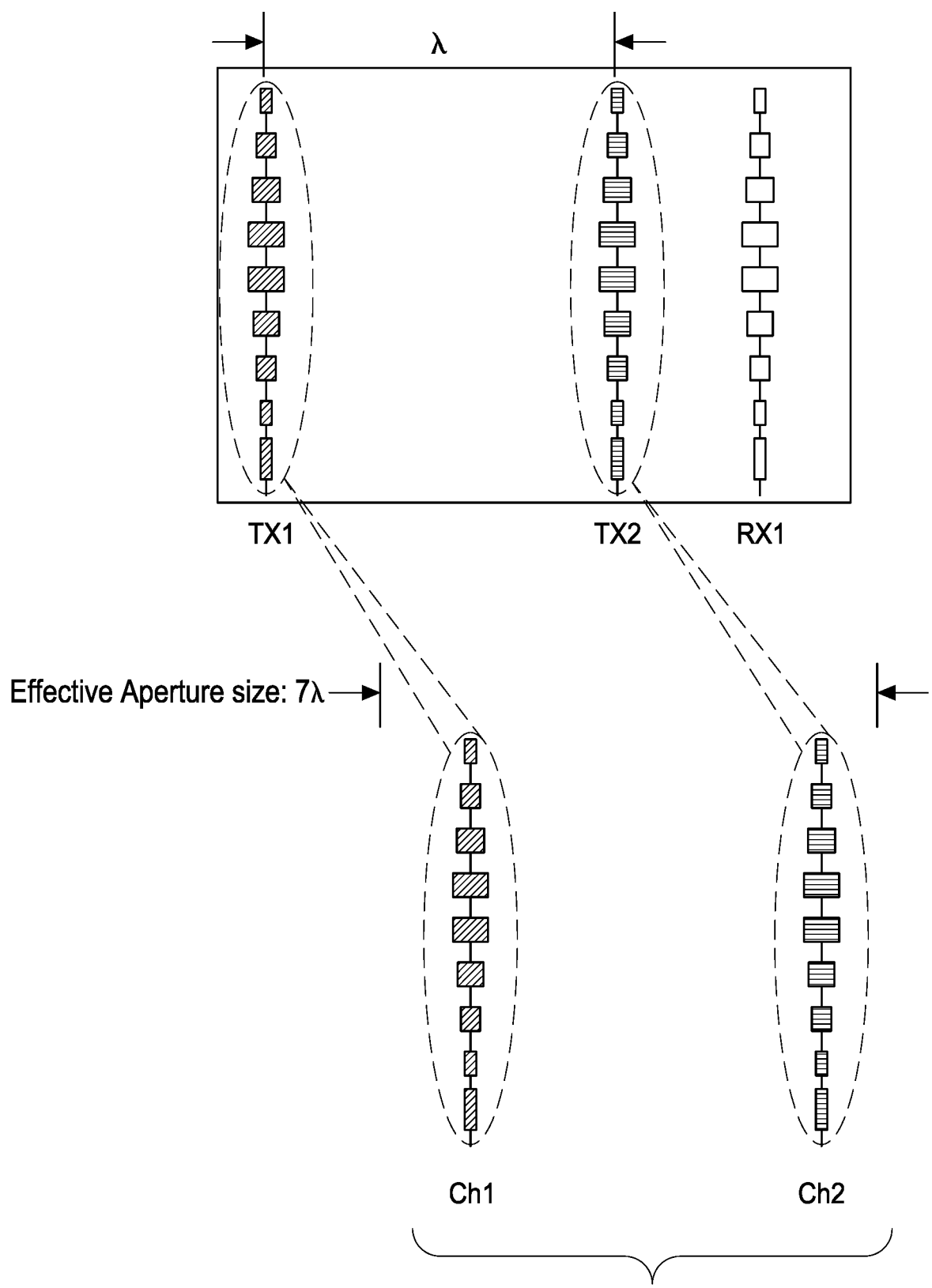
FIG. 6A illustrates an example of the angular resolution of a 2-virtual channel radar system in which two transmitter antenna elements are set a wavelength apart according to some embodiments.

FIG. 6A illustrates a 2-virtual channel radar system in which two transmitter antenna elements are a wavelength apart according to some embodiments. The distances between the transmitter antenna elements are larger than a half-wavelength by a factor of two. Accordingly, the 2 virtual channels CH1, CH2 are a wavelength apart and the radar system has an effective aperture size of a wavelength.

Figure 6B:
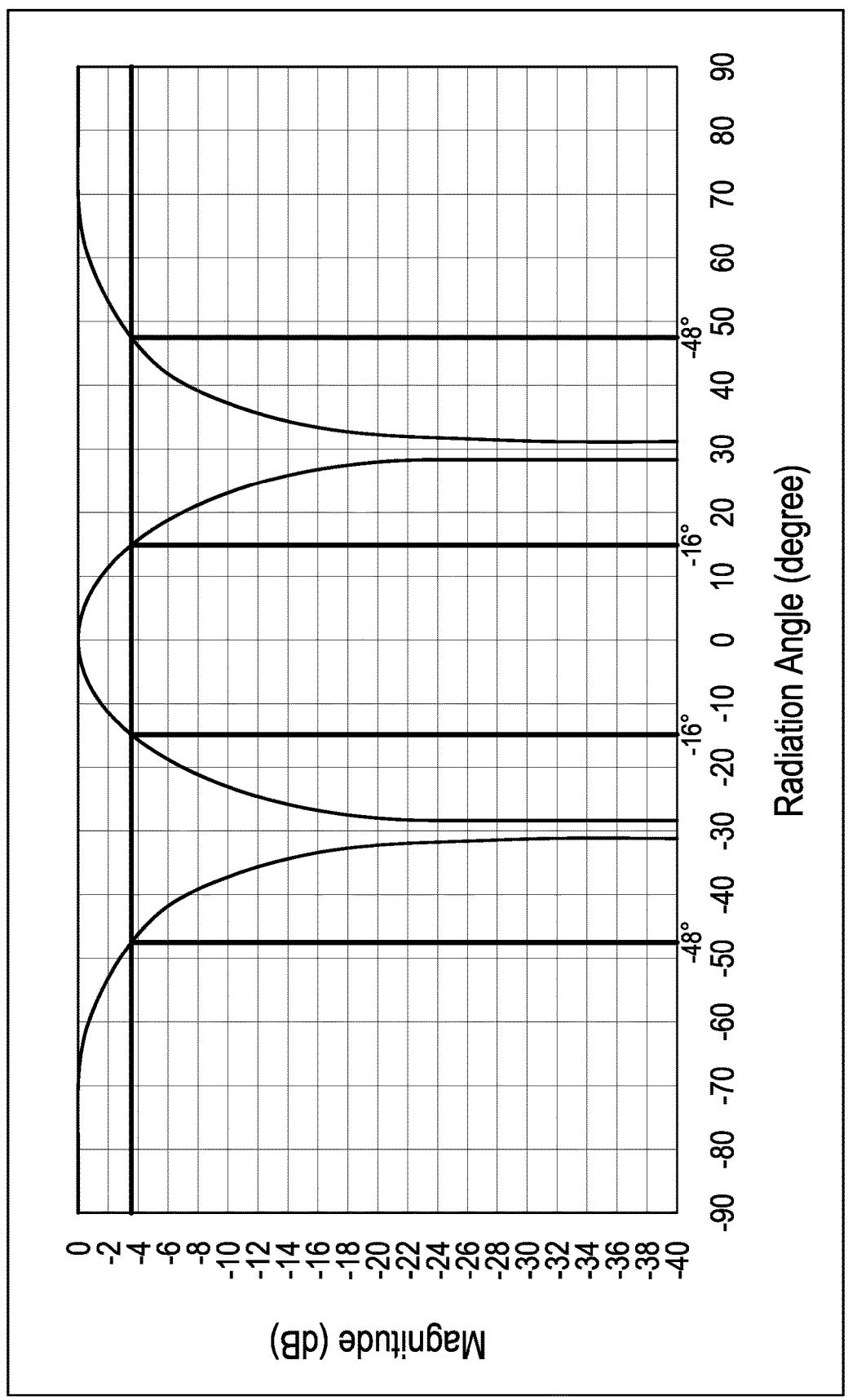
FIG. 6B illustrates an example of a radiation pattern of the radar system according to FIG. 6A.

FIG. 6B illustrates the radiation pattern of the radar system according to FIG. 6A according to some embodiments. As shown, the angular resolution for the main beam at −3 dB is from about −16 to 16 degrees, for a total angular resolution of about 32 degrees for the main beam. However, the radiation pattern includes grating lobes from −90 degrees to −48 degrees, and from 48 degrees to 90 degrees. Accordingly, angular ambiguity is introduced to the radar system by the presence of the grating lobes. Embodiments of this disclosure advantageously overcome these problems with grating lobes.

Figure 6C:
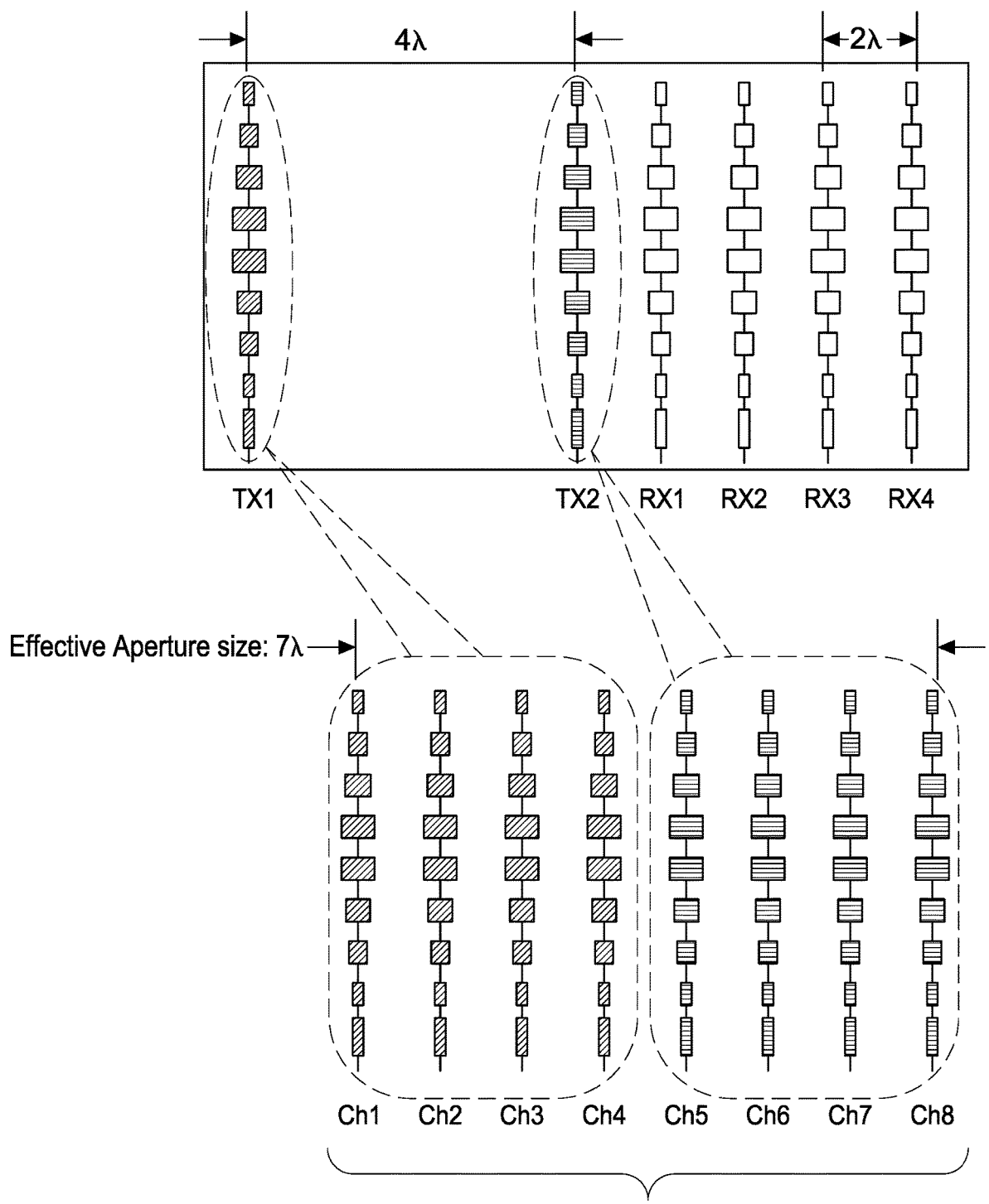
FIG. 6C illustrates an 8-virtual channel radar system in which two transmitter antenna elements are set four-wavelength apart according to some embodiments.

FIG. 6C illustrates an 8-virtual channel radar system where two transmitter antenna elements TX1, TX2 are four-wavelengths apart according to some embodiments. The receiver arrangement can include four receiver antenna elements RX1, RX2, RX3, RX4 that are a wavelength apart. As a result of the receiver arrangement and the transmitter arrangement, 8 virtual channels CH1, CH2, CH3, CH4, CH5, CH6, CH7, CH8 are created. The 8 virtual channels CH1, CH2, CH3, CH4, CH5, CH6, CH7, CH8 are each a wavelength apart. Accordingly, the radar system has an effective aperture size of seven-wavelengths, or fifteen-halve wavelengths if the antenna patch area is included.

Figure 6D:
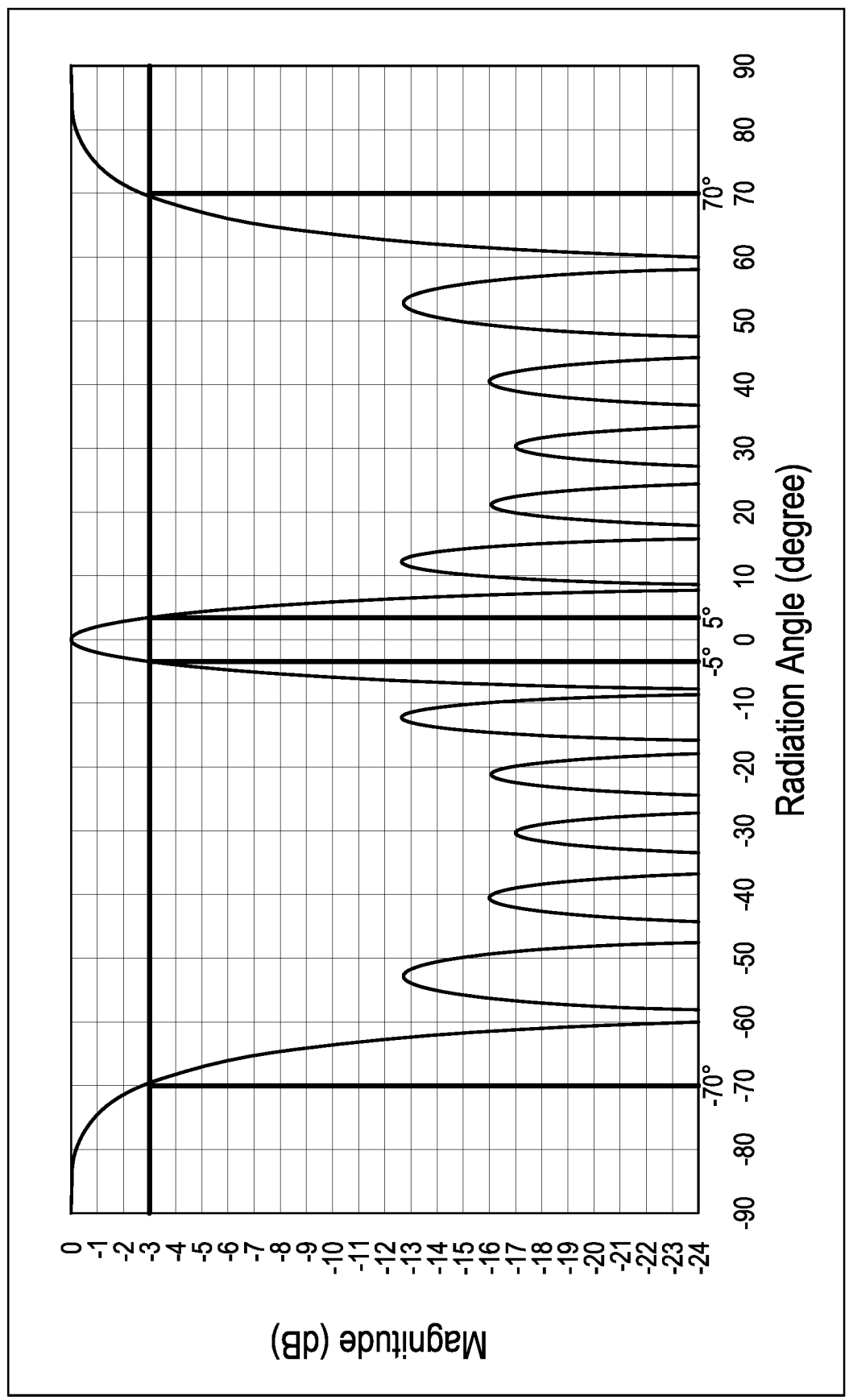
FIG. 6D illustrates an example of a radiation pattern of the radar system according to FIG. 6C.

FIG. 6D illustrates the radiation pattern of the radar system after digital beam forming process according to FIG. 6C according to some embodiments. As shown, the angular resolution for the main beam at −3 dB is from about −5 to 5 degrees, for a total angular resolution of about 10 degrees for the main beam. However, the radiation pattern shows also grating lobes from −90 degrees to −70 degrees, and from 70 degrees to 90 degrees. Accordingly, the angular ambiguity for the radar system is also worsened by the grating lobes.

Multiple-Input-Multiple-Output ("MIMO") Antenna Array with Varying Distances Between Twelve Virtual Channels To overcome the problems associated with the angular ambiguity due to grating lobes, systems and methods herein include a MIMO antenna array with a transmitter arrangement including a plurality of transmitter antenna elements arranged in a particular pattern and/or a receiver arrangement including a plurality of receiver antenna elements arranged in a particular pattern. The transmitter and/or receiver arrangement results in a wide range of distances between virtual channel pairings.

Figure 7:
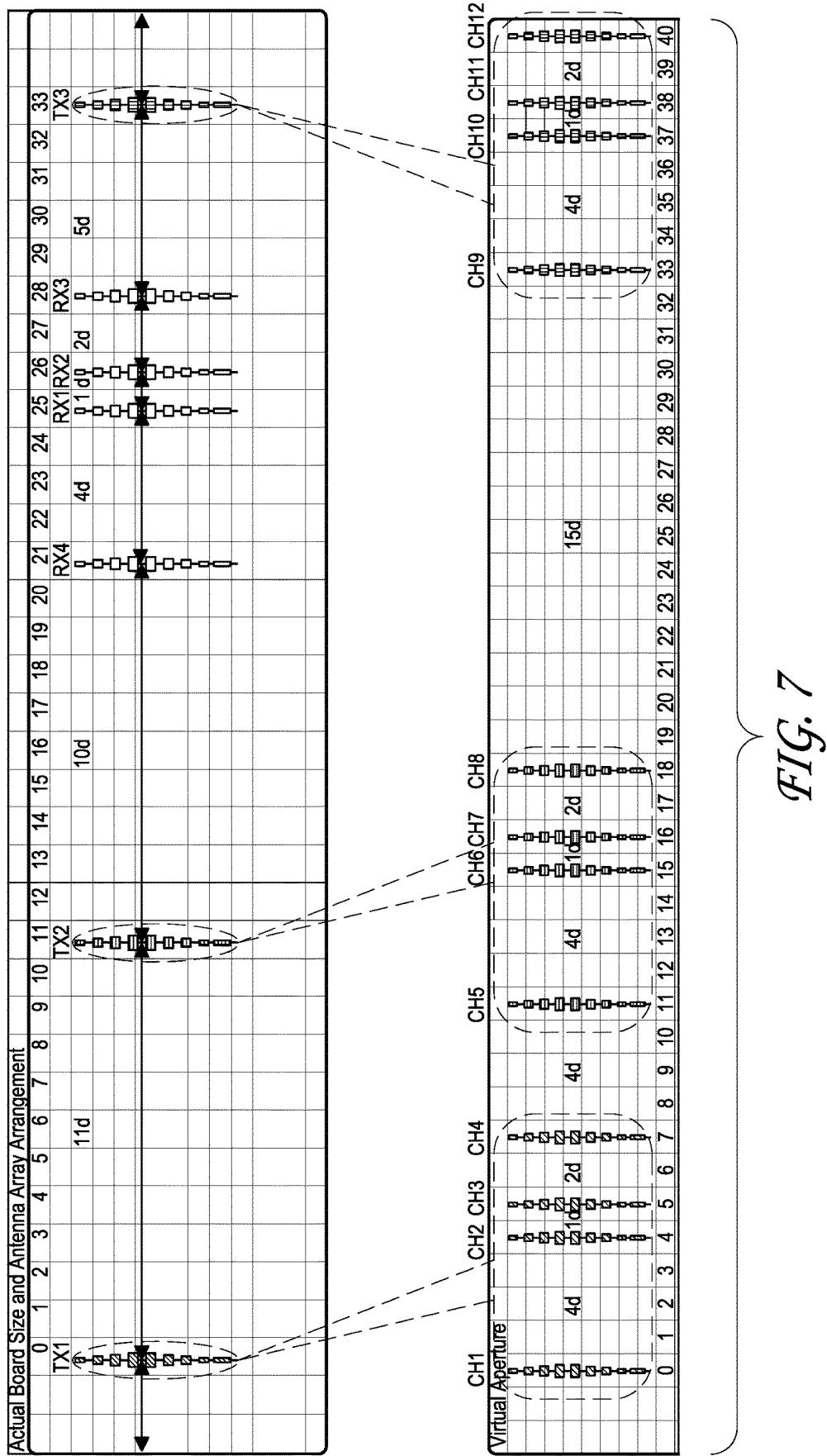
FIG. 7 illustrates a MIMO radar system having a wide range of distances among the 12 virtual channels according to some embodiments.

FIG. 7 illustrates a MIMO radar system with a wide range of distances among the 12 virtual channels according to some embodiments. In some embodiments, the radar system of FIG. 7 can be mounted on or integrated with an automobile and used for collision avoidance, adaptive cruise control, autonomous control and the like. In some embodiments, the radar system of FIG. 7 can radiate at relatively high frequencies, such as at 77 GHz or 24 GHz. Other frequencies will be applicable.

The radar system of FIG. 7 can include four receiver antenna elements RX1, RX2, RX3, RX4 and three transmitter antenna elements TX1, TX2, TX3. While illustrated in connection with four receiver antenna elements and three transmitter antenna elements, the principles and advantages disclosed herein will apply to other numbers of receiver and/or transmitter antenna elements. The distances between the four receiver antenna elements can vary. For example, the first receiver antenna element RX1 can be adjacent to the second receiver antenna element RX2 and spaced apart by a one-unit distance. The third receiver antenna element RX3 can be adjacent to the second receiver antenna element RX2 and spaced apart from the second receiver antenna element RX2 by a two-unit distance. The fourth receiver antenna element RX4 can be adjacent to the first receiver antenna element RX1 and spaced apart from the first receiver antenna element RX1 by a four-unit distance. When two antenna elements are described as adjacent herein, no other antenna element of either receiver or transmitter type exists between the two antenna elements. In some embodiments, the receiver antenna elements and/or the transmitter antenna elements are disposed along a single axis.

In some embodiments, the MIMO radar system can include a transmitter arrangement. The transmitter arrangement can include placement of transmitter antenna elements where the distances between the transmitter antenna elements vary. For example, the first transmitter antenna element TX1 can be adjacent to the third receiver antenna element RX3 and spaced apart by a 5-unit distance. The second transmitter antenna element TX2 can be adjacent to the fourth receiver antenna element RX4 by a ten-unit distance. The third transmitter antenna element TX3 can be adjacent to the second transmitter antenna element TX2 and spaced apart by an eleven-unit distance.

In some embodiments, a single unit distance is a half wavelength. In some embodiments, a single unit distance is a half wavelength +/−0.1%, +/−0.2%, +/−0.5%, +/−1%, +/−2%, +/−5%, +/−10%, +/−15%, +/−20%, +/−25%, +/−30%, +/−35%, and/or the like.

In some embodiments, one or more transmitter and/or receiver antenna array elements comprise a subarray.

The radar system of FIG. 7 exhibits 12 virtual channels CH1, CH2, CH3, CH4, CH5, CH6, CH7, CH8, CH9, CH10, CH11, CH12 by the four receiver antenna elements RX1, RX2, RX3, RX4 receiving signals from the three transmitter antenna elements TX1, TX2, TX3.

Figure 8:
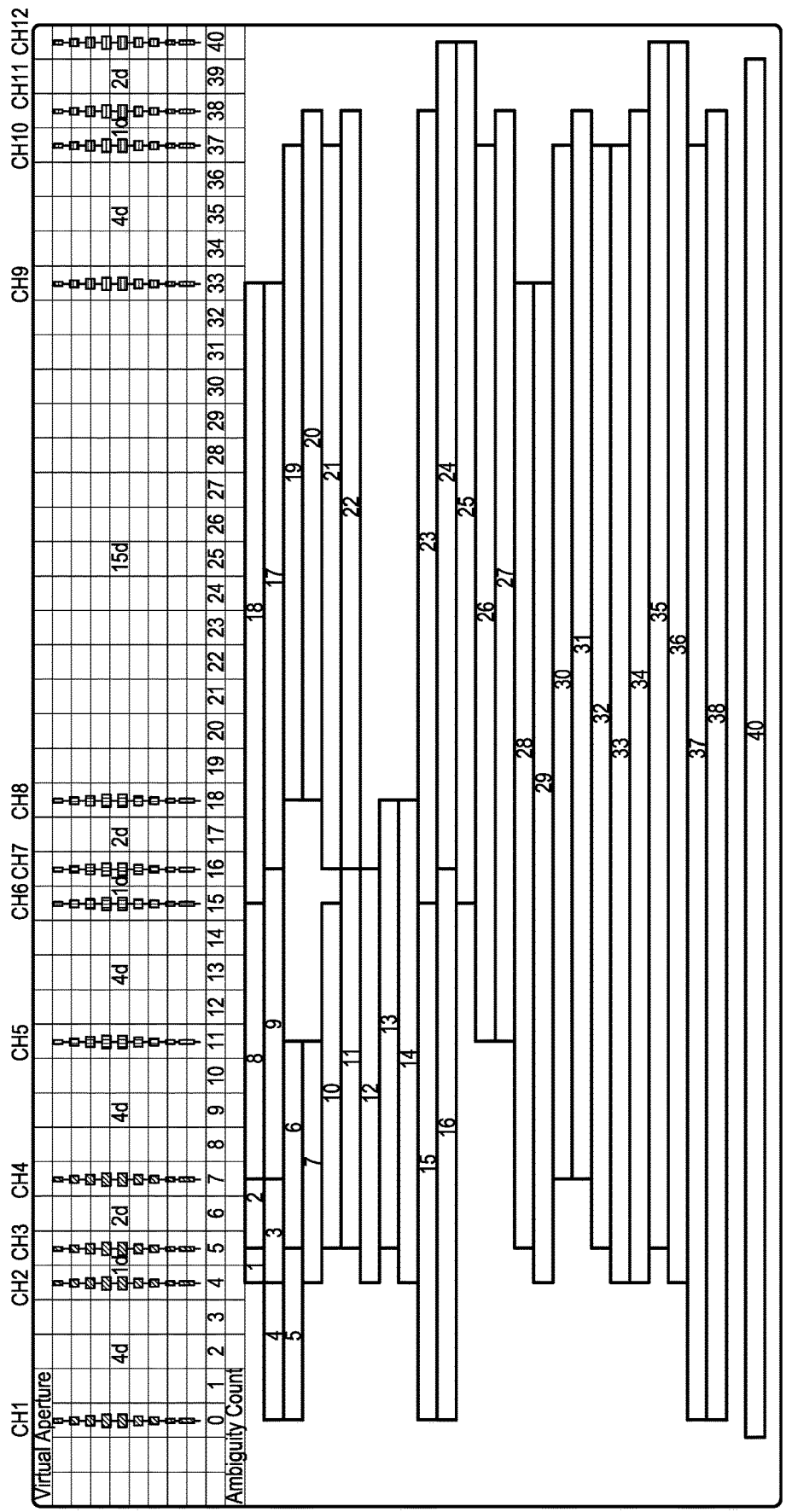
FIG. 8 illustrates distances between virtual channel pairings of the radar system in FIG. 7, according to some embodiments.

FIG. 8 illustrates distances between virtual channel pairings of the radar system in FIG. 7, according to some embodiments. The transmitter and receiver arrangement of the transmitter and receiver antenna elements create a wide range of virtual channel pairing distances. For example, the distance between virtual channels CH2 and CH3 is one-unit distance. The distance between virtual channels CH3 and CH4 is two-unit distance. The distance between virtual channels CH2 and CH4 is three-unit distance. The table below illustrates the wide range of virtual channel pairing distances:

| Virtual Channel Pairing | Distance Between Virtual Channel Pairing |
| --- | --- |
| CH2-CH3 | One-unit distance |
| CH3-CH4 | Two-unit distance |
| CH2-CH4 | Three-unit distance |
| CH1-CH2 | Four-unit distance |
| CH1-CH3 | Five-unit distance |
| CH3-CH5 | Six-unit distance |
| CH2-CH5 | Seven-unit distance |
| CH4-CH6 | Eight-unit distance |
| CH4-CH7 | Nine-unit distance |
| CH3-CH6 | Ten-unit distance |
| CH3-CH7 | Eleven-unit distance |
| CH2-CH7 | Twelve-unit distance |
| CH3-CH8 | Thirteen-unit distance |
| CH2-CH8 | Fourteen-unit distance |
| CH1-CH6 | Fifteen-unit distance |
| CH1-CH7 | Sixteen-unit distance |
| CH7-CH9 | Seventeen-unit distance |
| CH6-CH9 | Eighteen-unit distance |
| CH8-CH10 | Nineteen-unit distance |
| CH8-CH11 | Twenty-unit distance |
| CH7-CH10 | Twenty One-unit distance |
| CH7-CH11 | Twenty Two-unit distance |
| CH6-CH11 | Twenty Three-unit distance |
| CH7-CH12 | Twenty Four-unit distance |
| CH6-CH12 | Twenty Five-unit distance |
| CH5-CH10 | Twenty Six-unit distance |
| CH5-CH11 | Twenty Seven-unit distance |
| CH3-CH9 | Twenty Eight-unit distance |
| CH2-CH9 | Twenty Nine-unit distance |
| CH4-CH10 | Thirty-unit distance |
| CH4-CH11 | Thirty One-unit distance |
| CH3-CH10 | Thirty Two-unit distance |
| CH2-CH10 | Thirty Three-unit distance |
| CH2-CH11 | Thirty Four-unit distance |
| CH3-CH12 | Thirty Five-unit distance |
| CH2-CH12 | Thirty Six-unit distance |
| CH1-CH10 | Thirty Seven-unit distance |
| CH1-CH11 | Thirty Eight-unit distance |
| CH1-CH12 | Forty-unit distance |

As shown by the table above, the particular transmitter and receiver arrangement of transmitter and receiver antenna elements in the radar system of FIG. 7 creates virtual channel pairings with a wide range of unit distances between the pairings. The transmitter arrangement including a pattern of a plurality of transmitter antenna elements and the receiver arrangement including a pattern a plurality of receiver antenna elements as shown in FIG. 7 create virtual channels with virtual channel pairing distances that cover unit distances of 1-38 and 40 as shown in FIG. 8. Advantageously, the main beam width is relatively narrow for relatively good resolution while having reduced side lobes and an absence of grating lobes that would otherwise cause angular ambiguity.

Figure 9:
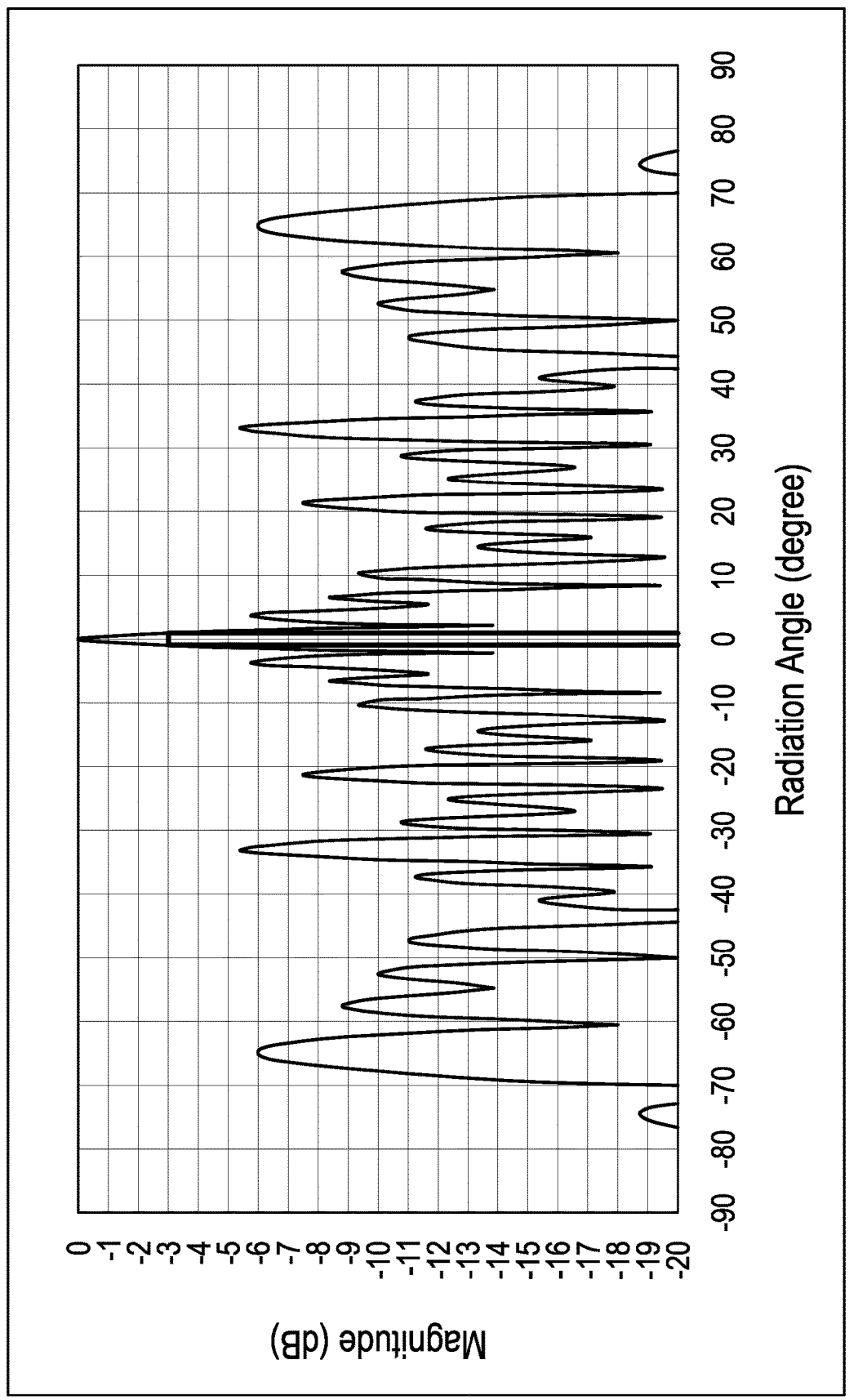
FIG. 9 is an illustration of a radiation pattern for the radar system of FIG. 7.

FIG. 9 is an illustration of a radiation pattern after the digital beam forming processing for the radar system of FIG. 7. The radiation pattern illustrates a main beam with about a 4 degree 3-dB beam-width. The side lobes have been reduced in magnitude. Advantageously, grating lobes are not present.

Fractional Adjustment of Distances Between Virtual Channel Pairings

The radiation pattern of a radar system with a wide range of distances between virtual channel pairs can include side lobes at different magnitudes. In some embodiments, the transmitter arrangement and/or the receiver arrangement can be modified for improved radiation pattern performance. For example, the side lobes can be reduced. The transmitter arrangement and/or the receiver arrangement can be modified by adjusting one or more distances between virtual channel pairs. The adjustment can be based on experimentation. For example, a distance between two transmitter antenna elements can be reduced by 25%.

In some embodiments, the transmitter arrangement and/or the receiver arrangement can be modified by adjusting the phase of one or more receiver and/or transmitter antenna elements. For example, the first two receiver antenna elements RX1, RX2 can be adjusted by 3 degrees in phase. The phase shifters can adjust the phase in the digital domain.

In some embodiments, the transmitter arrangement and/or the receiver arrangement can be modified by a taper and/or weighting applied to one or more receiver and/or transmitter antenna elements. For example, a weighting of 50% can be applied to two transmit antenna elements. In some embodiments, the weighting is applied in the digital domain.

In some embodiments, a fractional adjustment can be made to one or more receiver antenna elements and/or one or more transmitter antenna elements. In some embodiments, the one or more receiver antenna elements and/or one or more transmitter antenna elements that produce a bigger change to sidelobe performance than other antenna elements can be identified by, for example, simulation. The identified one or more receiver antenna elements and/or one or more transmitter antenna elements can be determined by simulation to be more sensitive than the other antenna elements. Then, adjustments can be made to the identified one or more receiver antenna elements and/or one or more transmitter antenna elements to improve the radiation pattern. For example, the designer can determine to make adjustments on the identified one or more receiver antenna elements and/or one or more transmitter antenna elements for sidelobe performance, to narrow main beam beamwidth, improve performance for scan angles, perform on certain frequencies and/or frequency ranges, perform on certain antenna types, and/or the like. These adjustments are frequently performed by antenna designers as part of the design process and can be based on simulation results and/or laboratory experiments.

Figure 10A:
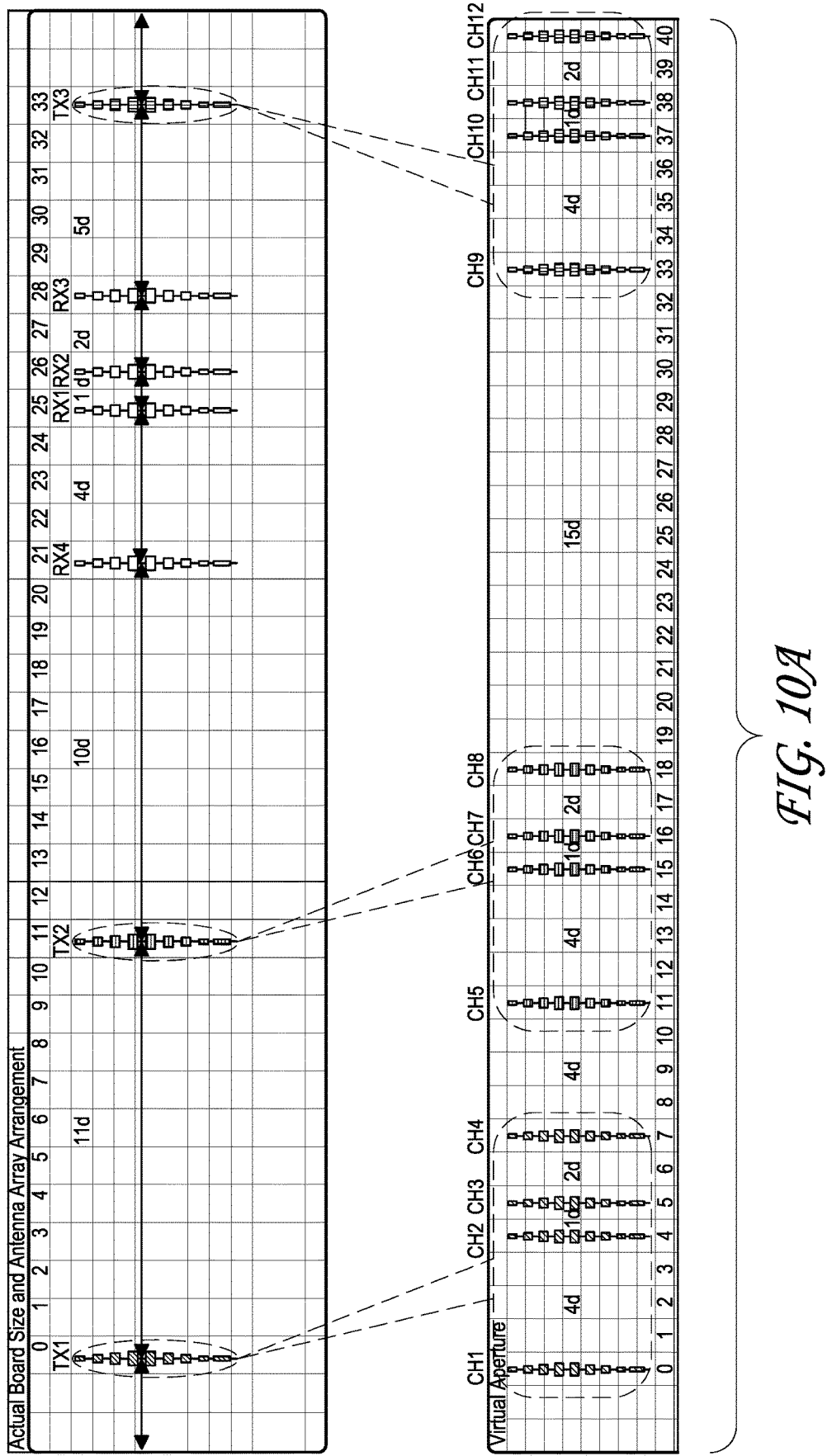
FIG. 10A is an illustration of a radar system with tapering applied to two transmitter antenna elements, and a distance adjustment between antenna elements.

FIG. 10A is an illustration of a radar system with tapering applied to two transmitter antenna elements, and a distance adjustment applied between antenna elements relative to the embodiment described earlier in connection with FIG. 7. In the example of FIG. 10A, a 50% tapering is applied to two transmitter antenna elements TX1, TX3, whereas the other transmitter and receiver antenna elements TX2, RX1, RX2, RX3, RX4 do not have tapering applied as indicated by 1.0 taper. Signal tapering can include a weighting factor that can diminish a value based on the weighting factor. Furthermore, the distance between a pair of receiver antenna elements RX4 and RX1 is adjusted from a 4-unit distance to a 3.5-unit distance.

Figure 10B:
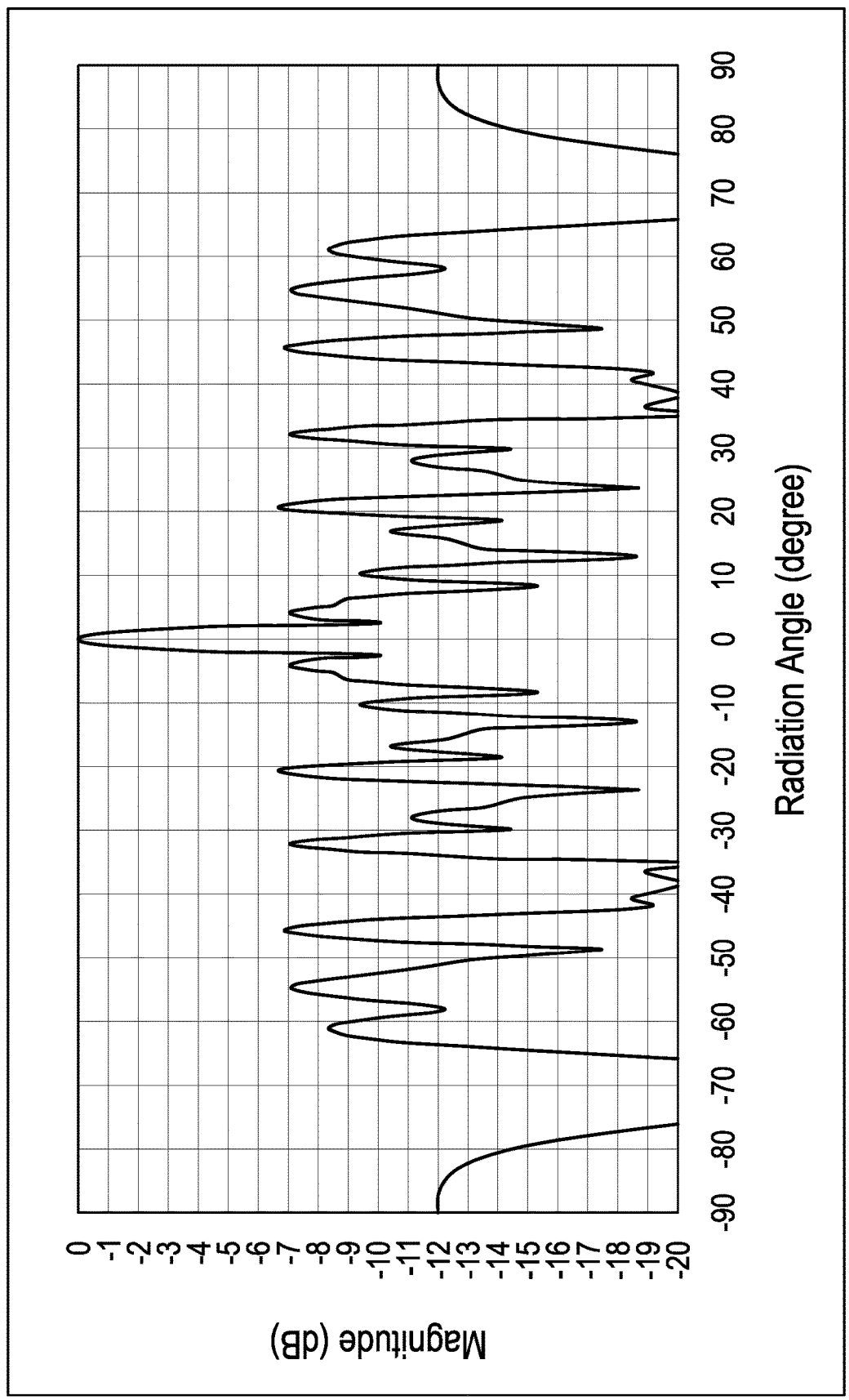
FIG. 10B is an illustration of a radiation pattern for the radar system of FIG. 10A.

FIG. 10B is an illustration of a radiation pattern for the radar system of FIG. 10A according to some embodiments. By applying the tapering to the two transmitter antenna elements TX1, TX3 and adjusting the distance between the pair of receiver antenna elements RX4 and RX1 from a 4-unit distance to a 3.5-unit distance, the side lobes are reduced to −7 dB in magnitude.

Figure 11:
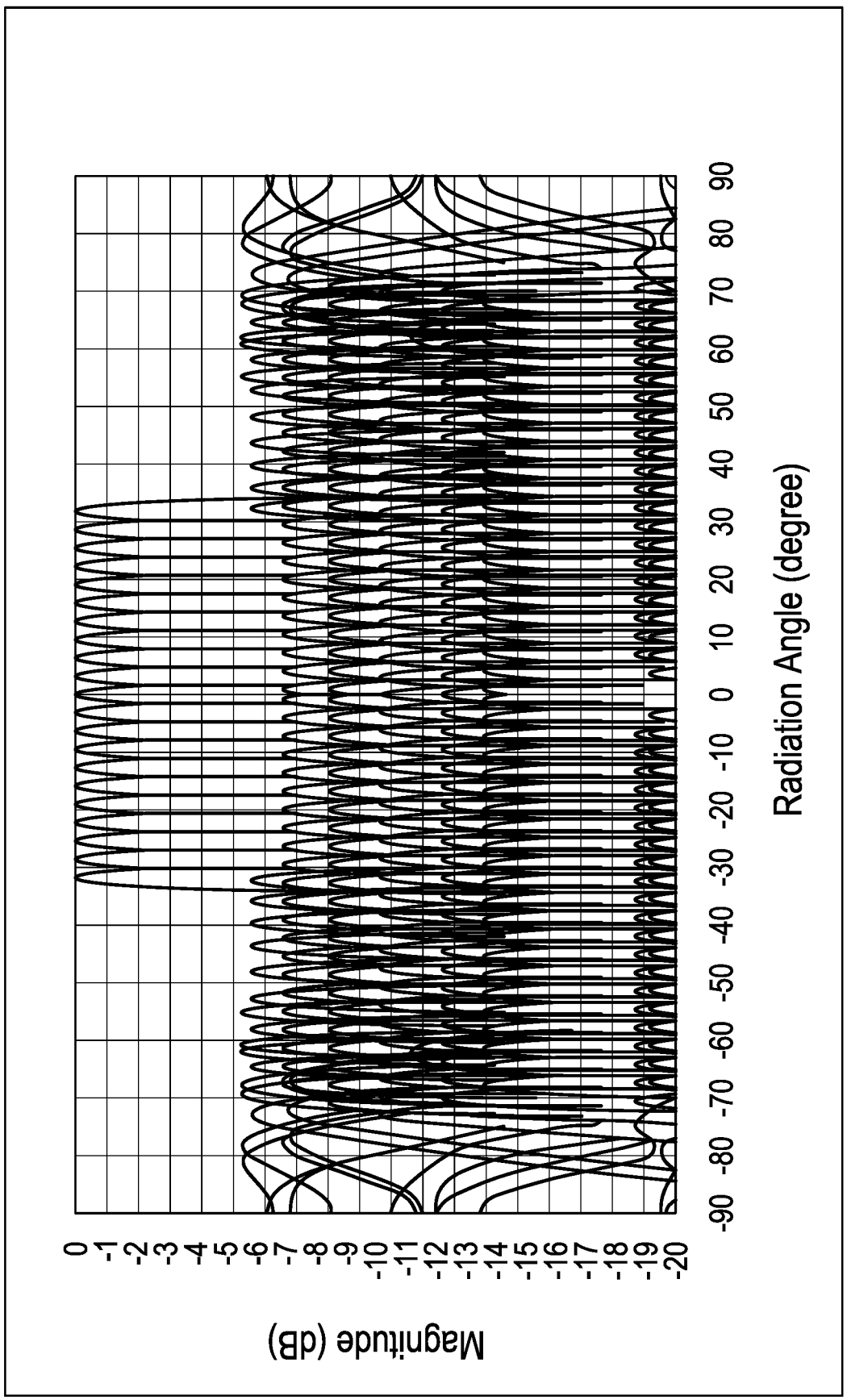
FIG. 11 is an illustration of shifted beams for the radar system of FIG. 10A.

FIG. 11 is an illustration of shifted beams for the radar system of FIG. 10A according to some embodiments. The shifted beams can be generated by applying digital beam forming. FIG. 11 illustrates shifted beams between +/−30 degrees with a 3 degree gap in between.

Figure 12A:
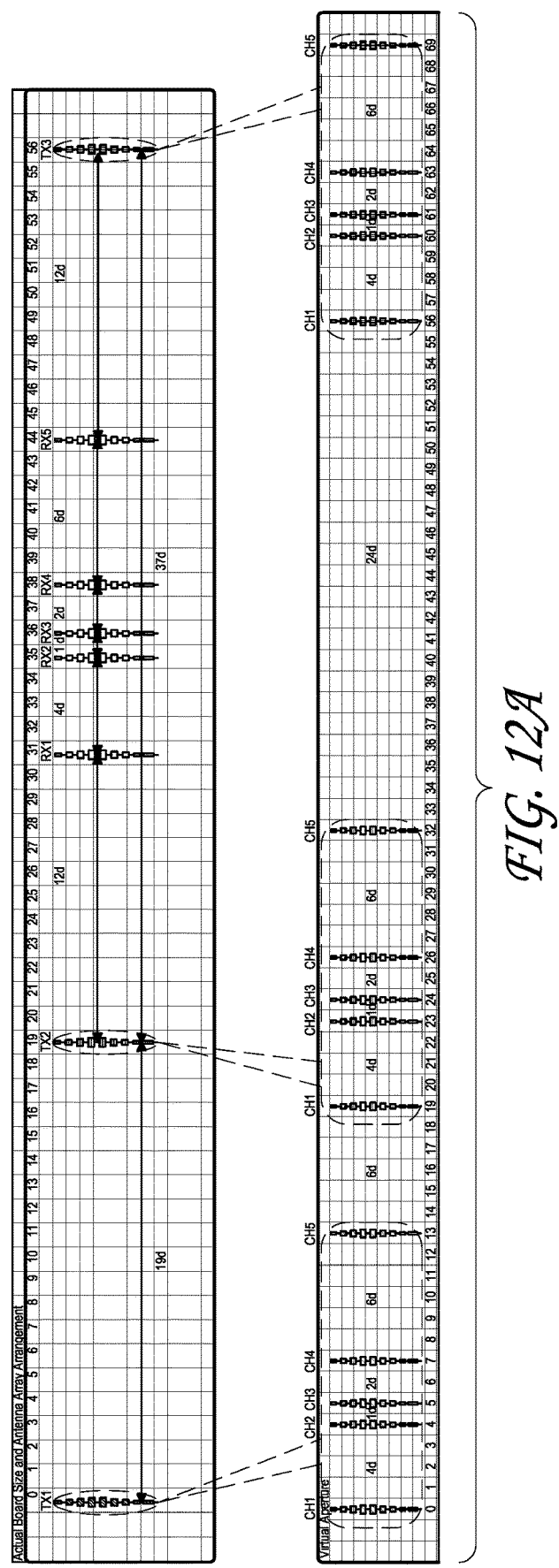
FIG. 12A illustrates a MIMO radar system with a wide range of distances among the 15 virtual channels according to some embodiments.
Figures 1, 12B:
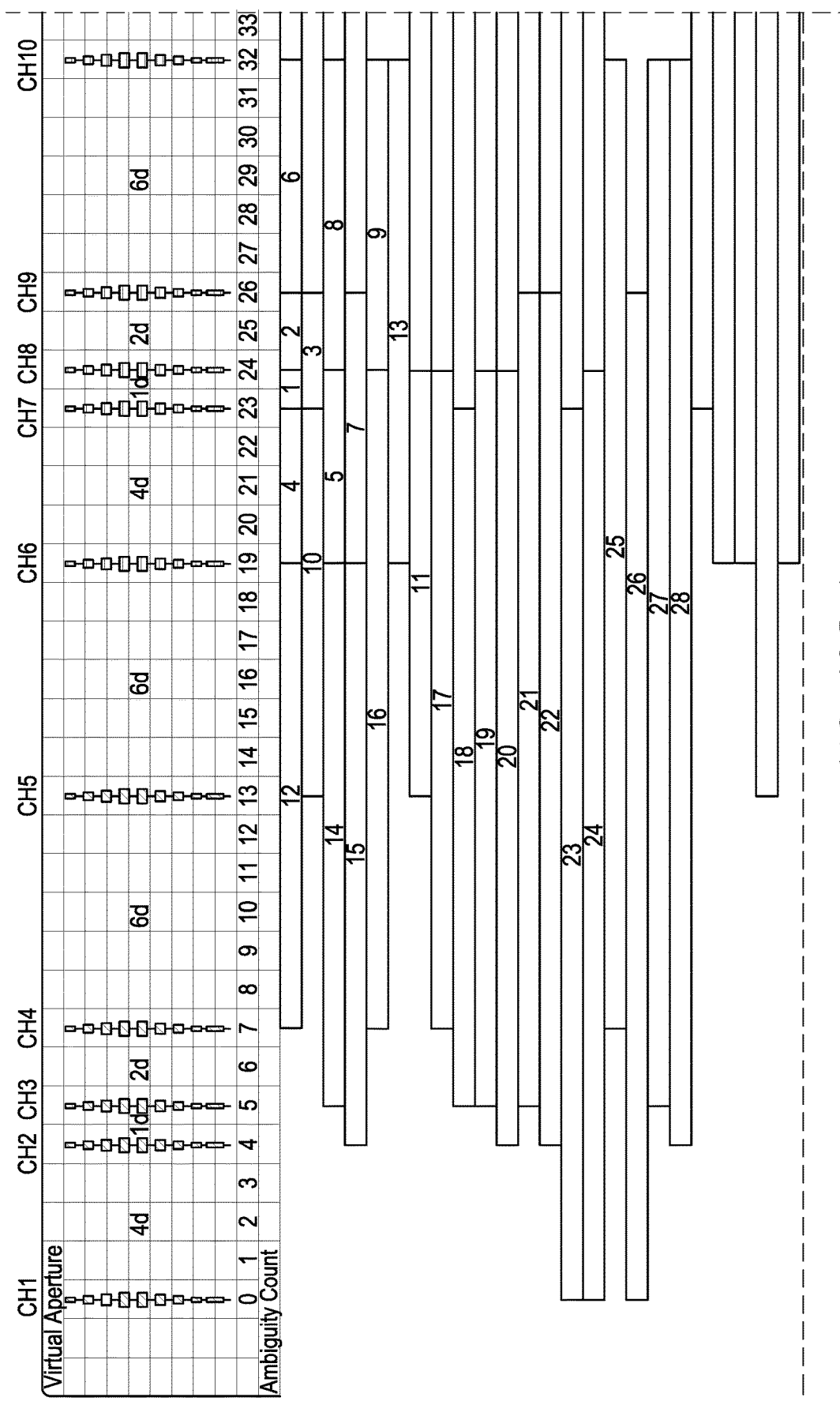
Figures 2, 12B:
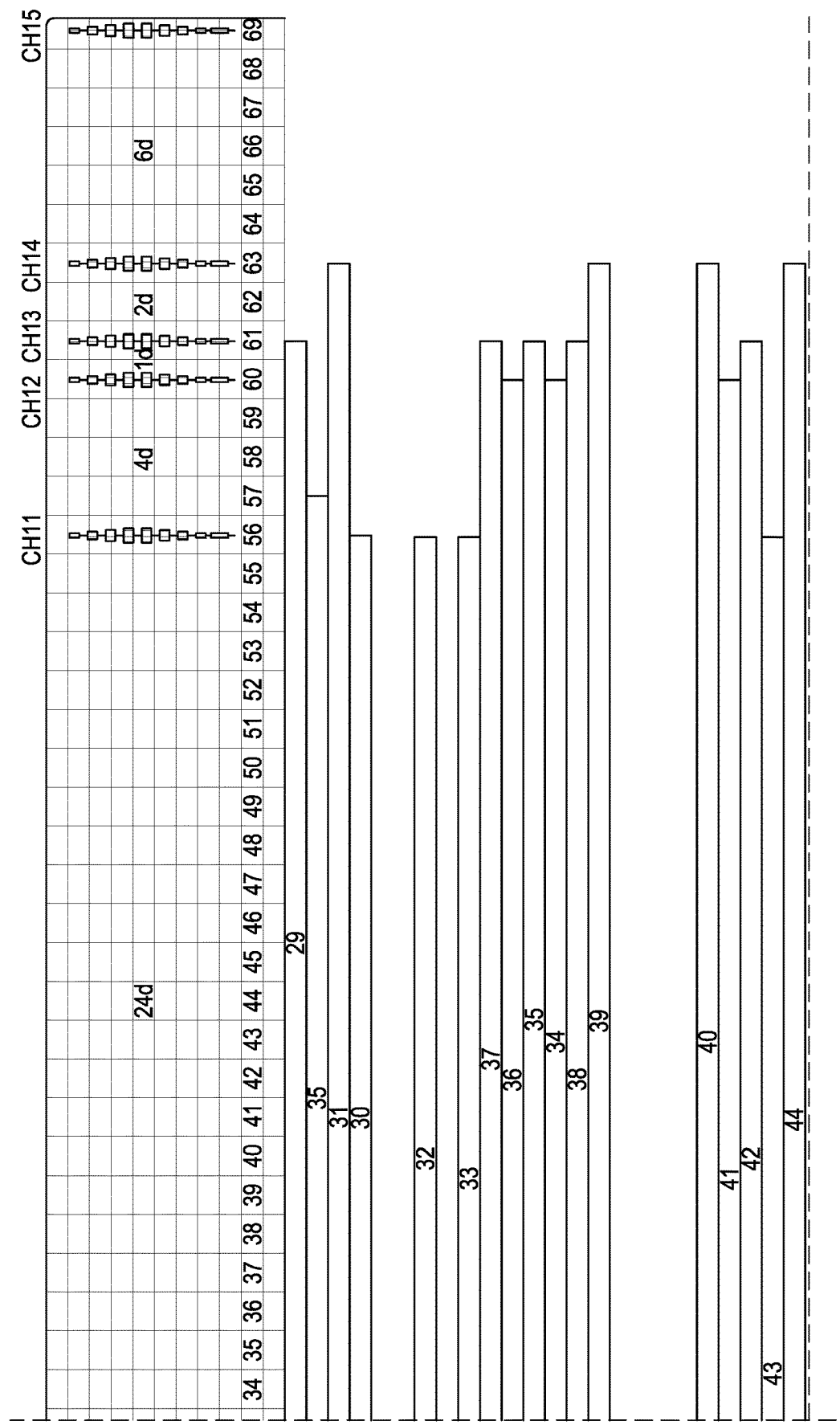
Figures 3, 12B:
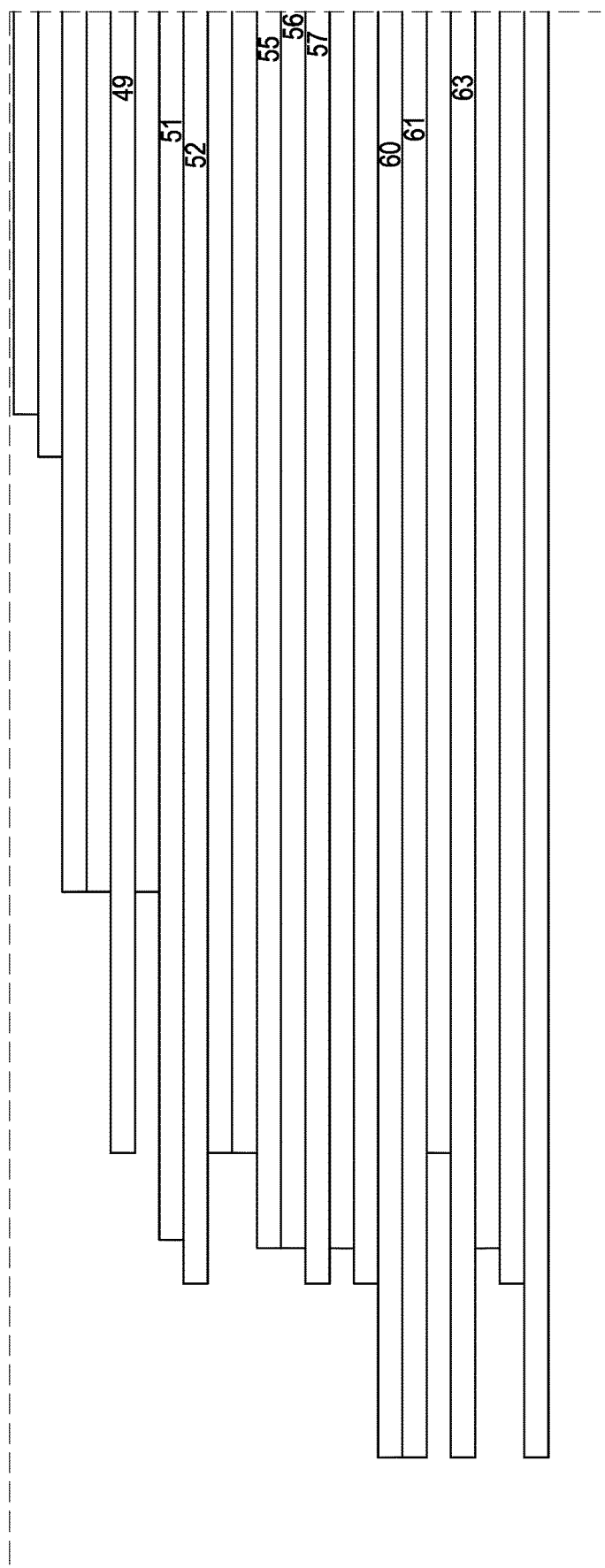

Multiple-Input-Multiple-Output ("MIMO") Antenna Array with Varying Distances Between Fifteen Virtual Channels FIG. 12A illustrates a MIMO radar system with a wide range of distances among the 15 virtual channels according to some embodiments. The radar system of FIG. 12A includes five receiver antenna elements RX1, RX2, RX3, RX4, RX5 and three transmitter antenna elements TX1, TX2, TX3. In some embodiments, the distances between the five receiver antenna elements can vary. In some embodiments, the first receiver antenna element RX1 can be adjacent to the second receiver antenna element RX2 separated by a four-unit distance. In some embodiments, the third receiver antenna element RX3 can be adjacent to the second receiver antenna element RX2 by a one-unit distance. In some embodiments, the fourth receiver antenna element RX4 can be adjacent to the third receiver antenna element RX1 by a two-unit distance. In some embodiments, the fifth receiver antenna element RX5 can be adjacent to the fourth receiver antenna element RX4 by a six-unit distance.

In some embodiments, the first transmitter antenna element TX1 can be adjacent to the fifth receiver antenna element RX5 by a 12-unit distance. In some embodiments, the second transmitter antenna element TX2 can be adjacent to the first receiver antenna element RX1 by a 12-unit distance. In some embodiments, the third transmitter antenna element TX3 can be adjacent to the second transmitter antenna element TX2 by a 19-unit distance.

The radar system of FIG. 12A can include 15 virtual channels CH1, CH2, CH3, CH4, CH5, CH6, CH7, CH8, CH9, CH10, CH11, CH12, CH13, CH14, CH15 generated by the five receiver antenna elements RX1, RX2, RX3, RX4, RX5 receiving signals from the three transmitter antenna elements TX1, TX2, TX3.

FIGS. 12B-1, 12B-2, 12B-3, and 12B-4 illustrate distances between virtual channel pairings of the radar system in FIG. 12A, according to some embodiments. The transmitter and receiver arrangement of the transmitter and receiver antenna elements can create a wide range of virtual channel pairing distances. In some embodiments, the distance between virtual channels CH7 and CH8 is one-unit distance. In some embodiments, the distance between virtual channels CH8 and CH9 is two-unit distance. In some embodiments, the distance between virtual channels CH7 and CH10 is three-unit distance. The table below illustrates the wide range of virtual channel pairing distances:

| Virtual Channel Pairing | Distance Between Virtual Channel Pairing |
|---|---|
| CH7-CH8 | One-unit distance |
| CH8-CH9 | Two-unit distance |
| CH7-CH9 | Three-unit distance |
| CH6-CH7 | Four-unit distance |
| CH6-CH8 | Five-unit distance |
| CH9-CH10 | Six-unit distance |
| CH6-CH9 | Seven-unit distance |
| CH8-CH10 | Eight-unit distance |
| CH7-CH10 | Nine-unit distance |
| CH5-CH7 | Ten-unit distance |
| CH5-CH8 | Eleven-unit distance |
| CH4-CH6 | Twelve-unit distance |
| CH6-CH10 | Thirteen-unit distance |
| CH3-CH6 | Fourteen-unit distance |
| CH2-CH6 | Fifteen-unit distance |
| CH4-CH7 | Sixteen-unit distance |
| CH4-CH8 | Seventeen-unit distance |
| CH3-CH7 | Eighteen-unit distance |
| CH3-CH8 | Nineteen-unit distance |
| CH2-CH8 | Twenty-unit distance |
| CH3-CH9 | Twenty One-unit distance |
| CH2-CH9 | Twenty Two-unit distance |
| CH1-CH7 | Twenty Three-unit distance |
| CH1-CH8 | Twenty Four-unit distance |
| CH4-CH10 | Twenty Five-unit distance |
| CH1-CH9 | Twenty Six-unit distance |
| CH3-CH10 | Twenty Seven-unit distance |
| CH2-CH10 | Twenty Eight-unit distance |
| CH10-CH13 | Twenty Nine-unit distance |
| CH9-CH11 | Thirty-unit distance |
| CH10-CH14 | Thirty One-unit distance |
| CH8-CH11 | Thirty Two-unit distance |
| CH7-CH11 | Thirty Three-unit distance |
| CH9-CH12 | Thirty Four-unit distance |
| CH9-CH13 | Thirty Five-unit distance |
| CH8-CH12 | Thirty Six-unit distance |
| CH8-CH13 | Thirty Seven-unit distance |
| CH7-CH13 | Thirty Eight-unit distance |
| CH8-CH14 | Thirty Nine-unit distance |
| CH7-CH14 | Forty-unit distance |
| CH6-CH12 | Forty One-unit distance |
| CH6-CH13 | Forty Two-unit distance |
| CH5-CH11 | Forty Three-unit distance |
| CH6-CH14 | Forty Four-unit distance |
| CH8-CH15 | Forty Five-unit distance |
| CH7-CH15 | Forty Six-unit distance |
| CH5-CH12 | Forty Seven-unit distance |
| CH5-CH13 | Forty Eight-unit distance |
| CH4-CH11 | Forty Nine-unit distance |
| CH5-CH14 | Fifty-unit distance |
| CH3-CH11 | Fifty One-unit distance |
| CH2-CH11 | Fifty Two-unit distance |
| CH4-CH12 | Fifty Three-unit distance |
| CH4-CH13 | Fifty Four-unit distance |
| CH3-CH12 | Fifty Five-unit distance |
| CH3-CH13 | Fifty Six-unit distance |
| CH2-CH13 | Fifty Seven-unit distance |
| CH3-CH14 | Fifty Eight-unit distance |
| CH2-CH14 | Fifty Nine-unit distance |
| CH1-CH12 | Sixty-unit distance |
| CH1-CH13 | Sixty One-unit distance |
| CH4-CH15 | Sixty Two-unit distance |
| CH1-CH14 | Sixty Three-unit distance |
| CH3-CH15 | Sixty Four-unit distance |
| CH2-CH15 | Sixty Five-unit distance |
| CH1-CH15 | Sixty Nine-unit distance |

As shown by the table above, the particular transmitter and receiver arrangement of transmitter and receiver antenna elements in the radar system of FIG. 12A creates virtual channel pairings with a wide range of unit distances between the pairings. The transmitter arrangement including a pattern of a plurality of transmitter antenna elements and the receiver arrangement including a pattern a plurality of receiver antenna elements as shown in FIG. 12A create virtual channels with virtual channel pairing distances that cover unit distances of 1-65 and 69 as shown in FIGS. 12B-1, 12B-2, 12B-3, and 12B-4. Advantageously, the main beam width is greatly narrowed while reducing side lobes and avoiding grating lobes from affecting the angular resolution.

Applications

Any of the principles and advantages discussed herein can be applied to other systems, not just to the systems described above. The elements and operations of the various embodiments described above can be combined to provide further embodiments. Some of the embodiments described above have provided examples in connection with transceiver integrated circuits. However, the principles and advantages of the embodiments can be used in connection with any other systems, apparatus, or methods that could benefit from any of the teachings herein. For instance, any of the principles and advantages discussed herein can be implemented in connection with any devices with a need for calibration of transmit and receive paths. Although the digital signal processor is described for both transmitting and receiving, the digital signal processor may be multiple processors (e.g., a separate digital signal processors for a transmitter and a receiver). Although embodiments describe connecting paths via a coupler, other suitable components can be used to connect signal paths.

Aspects of this disclosure can be implemented in various electronic devices. Examples of the electronic devices can include, but are not limited to, consumer electronic products, parts of the consumer electronic products such as semiconductor die and/or packaged modules, electronic test equipment, wireless communication devices, personal area network communication devices, cellular communications infrastructure such as a base station, etc. Examples of the consumer electronic products can include, but are not limited to, a mobile phone such as a smart phone, a wearable computing device such as a smart watch or an ear piece, a telephone, a television, a computer monitor, a computer, a router, a modem, a hand-held computer, a laptop computer, a tablet computer, a personal digital assistant (PDA), a microwave, a refrigerator, a vehicular electronics system such as an automotive electronics system, a stereo system, a DVD player, a CD player, a digital music player such as an MP3 player, a radio, a camcorder, a camera such as a digital camera, a portable memory chip, a washer, a dryer, a washer/dryer, peripheral device, a clock, a light detecting and ranging (Lidar) system, etc. Further, the electronic devices can include unfinished products.

CONCLUSION

Unless the context requires otherwise, throughout the description and the claims, the words "comprise," "comprising," "include," "including," and the like are to generally be construed in an inclusive sense, as opposed to an exclusive or exhaustive sense; that is to say, in the sense of "including, but not limited to." The word "coupled," as generally used herein, refers to two or more elements that may be either directly coupled to each other, or coupled by way of one or more intermediate elements. Likewise, the word "connected," as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description of Certain Embodiments using the singular or plural may also include the plural or singular, respectively. The word "or" in reference to a list of two or more items, is generally intended to encompass all of the following interpretations of the word: any of the items in the list, all of the items in the list, and any combination of the items in the list.

Moreover, conditional language used herein, such as, among others, "can," "could," "might," "may," "e.g.," "for example," "such as" and the like, unless specifically stated otherwise or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding whether these features, elements and/or states are included or are to be performed in any particular embodiment.

While certain embodiments have been described, these embodiments have been presented by way of example only, and are not intended to limit the scope of the disclosure. Indeed, the novel methods, apparatus, and systems described herein may be embodied in a variety of other forms; furthermore, various omissions, substitutions and changes in the form of the methods, apparatus, and systems described herein may be made without departing from the spirit of the disclosure. For example, circuit blocks described herein may be deleted, moved, added, subdivided, combined, and/or modified. Each of these circuit blocks may be implemented in a variety of different ways. The accompanying claims and their equivalents are intended to cover any such forms or modifications as would fall within the scope and spirit of the disclosure.

What is claimed is:

1. A multiple-in-multiple-out ("MIMO") antenna array apparatus comprising:
    a receiver antenna arrangement, wherein the receiver antenna arrangement comprises a plurality of receiver antenna elements of an antenna array arranged in a pattern such that a first receiver antenna element is adjacent to a second receiver antenna element at a first distance, and the second receiver antenna element is adjacent to a third receiver antenna element at a second distance; and
    a transmitter antenna arrangement, wherein the transmitter antenna arrangement comprises a first transmitter antenna element that is adjacent to the third receiver antenna element at a third distance, wherein the first distance, the second distance, and the third distance are different distances, wherein the third distance is about five times the first distance.

2. The MIMO antenna array apparatus of claim 1, wherein the receiver antenna arrangement further comprises a pattern such that the first receiver antenna element is adjacent to a fourth receiver antenna element at a forth distance, and the fourth receiver antenna element is adjacent to a fifth receiver antenna element at a fifth distance, wherein the first distance, the second distance, the third distance, the fourth distance, and the fifth distance are different distances.

3. The MIMO antenna array apparatus of claim 2, wherein the transmitter antenna arrangement further comprises a pattern such that a second transmitter antenna element is adjacent to the fifth receiver antenna element at a sixth distance and a third transmitter antenna element is adjacent to the second transmitter antenna element at a seventh distance, wherein the first distance, the second distance, the third distance, the fourth distance, the fifth distance, and the sixth distance are different distances.

4. The MIMO antenna array apparatus of claim 1, wherein the first distance is a wavelength.

5. The MIMO antenna array apparatus of claim 4, wherein the second distance is a half wavelength.

6. The MIMO antenna array apparatus of claim 4, wherein the third distance is two wavelengths.

7. The MIMO antenna array apparatus of claim 1, wherein the receiver antenna arrangement and the transmitter antenna arrangement are arranged in a pattern such that the receiver antenna elements and the one or more transmitter antenna elements are disposed on along a single axis.

8. A multiple-in-multiple-out ("MIMO") antenna array apparatus for radar comprising:
   a receiver antenna arrangement, wherein the receiver antenna arrangement comprises a plurality of receiver antenna elements of an antenna array arranged in a pattern such that a first receiver antenna element is adjacent to a second receiver antenna element at about a one-unit distance, a third receiver antenna element is adjacent to the second receiver antenna element at about a two-unit distance, and a fourth receiver antenna element is adjacent to the first receiver antenna element at about a four-unit distance; and
   a transmitter antenna arrangement, wherein the transmitter antenna arrangement comprises one or more transmitter antenna elements of an antenna array arranged in a pattern such that a first transmitter antenna element is adjacent to the third receiver antenna element at about a five-unit distance and is placed in the one side of the printed circuit board.

9. The MIMO antenna array apparatus of claim 8, wherein the transmitter antenna arrangement further comprises a second transmitter antenna element adjacent to the first transmitter antenna element at about a ten-unit distance.

10. The MIMO antenna array apparatus of claim 9, wherein the transmitter antenna arrangement further comprises a third transmitter antenna element adjacent to the second transmitter antenna element at about an eleven-unit distance.

11. The MIMO antenna array apparatus of claim 8, wherein the receiver antenna arrangement and the transmitter antenna arrangement are arranged in a pattern such that the receiver antenna elements and the transmitter antenna elements are disposed on along a single axis.

12. The MIMO antenna array apparatus of claim 8, wherein a single unit distance is a half wavelength.

13. The MIMO antenna array apparatus of claim 8, wherein a single unit distance is a half wavelength +/−10%.

14. The MIMO antenna array apparatus of claim 8, wherein a single unit distance is a half wavelength +/−25%.

15. A multiple-in-multiple-out ("MIMO") antenna array apparatus for radiation of radio frequency signals comprising:
   an antenna element arrangement, wherein the antenna element arrangement comprises a plurality of antenna elements arranged in a pattern such that:
   a first antenna element is adjacent to a second antenna element,
   a third antenna element is adjacent to the second antenna element,
   a fourth antenna element is adjacent to the first antenna element, and
   a fifth antenna element is adjacent to the third antenna element, wherein each of the antenna elements comprise a transmit antenna element and/or a receiver antenna element, wherein the antenna elements of the antenna element arrangement are placed along a single axis, wherein the distances between adjacent antenna elements in the antenna element arrangement are not evenly spaced, wherein a distance between the third antenna element and the fifth antenna element is about five times the distance between first antenna element and the second antenna element.

16. The MIMO antenna array apparatus of claim 15, wherein a distance between two adjacent antenna elements include a half wavelength.

17. The MIMO antenna array apparatus of claim 16, wherein a distance between two other adjacent antenna elements include a wavelength.

18. The MIMO antenna array apparatus of claim 17, wherein a distance between two other adjacent antenna elements include two wavelengths.

19. The MIMO antenna array apparatus of claim 15, wherein the antenna element arrangement comprises a sixth antenna element adjacent to the fifth antenna element, wherein the first, second, third, and fourth antenna elements comprise receiver antenna elements, and the fifth and sixth antenna elements comprise transmitter antenna elements, wherein the distances between adjacent antenna elements in the antenna element arrangement are not evenly spaced.

20. The MIMO antenna array apparatus of claim 15, wherein the antenna element arrangement comprises a sixth antenna element adjacent to the fourth antenna element, a seventh antenna element adjacent to the sixth antenna element, and an eighth antenna element adjacent to the seventh antenna element, wherein the first, second, third, fourth, and fifth antenna elements comprise receiver antenna elements, and the sixth, seventh, and eighth antenna elements comprise transmitter antenna elements, wherein the distances between adjacent antenna elements in the antenna element arrangement are not evenly spaced.

* * * * *